United States Patent
Wu et al.

(10) Patent No.: US 12,003,458 B2
(45) Date of Patent: Jun. 4, 2024

(54) SIDELINK FEEDBACK TRANSMISSION AND FEEDBACK RESOURCE DETERMINATION

(71) Applicant: QUALCOMM Incorporated, San Diego, CA (US)

(72) Inventors: Shuanshuan Wu, San Diego, CA (US); Sudhir Kumar Baghel, Hillsborough, NJ (US); Kapil Gulati, Belle Mead, NJ (US); Gabi Sarkis, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 952 days.

(21) Appl. No.: 17/003,738

(22) Filed: Aug. 26, 2020

(65) Prior Publication Data

US 2021/0099269 A1 Apr. 1, 2021

Related U.S. Application Data

(60) Provisional application No. 62/909,011, filed on Oct. 1, 2019.

(51) Int. Cl.
*H04L 5/00* (2006.01)
*H04W 92/18* (2009.01)

(52) U.S. Cl.
CPC ............ *H04L 5/0055* (2013.01); *H04L 5/001* (2013.01); *H04W 92/18* (2013.01)

(58) Field of Classification Search
CPC ..... H04L 5/0055; H04L 5/001; H04L 1/1854; H04L 5/0033; H04L 27/2602;
(Continued)

(56) References Cited

U.S. PATENT DOCUMENTS

2017/0223695 A1* 8/2017 Kwak .................... H04L 5/0051
2018/0352568 A1* 12/2018 Kim ....................... H04L 5/0053
(Continued)

OTHER PUBLICATIONS

ITL: "Physical Layer Procedure for NR V2X", 3GPP Draft, 3GPP TSG RAN WG1 #98, R1-1909117_V2X_PHY Procedure, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019 (Year: 2019).*

(Continued)

*Primary Examiner* — Hardikkumar D Patel
(74) *Attorney, Agent, or Firm* — Holland & Hart LLP

(57) ABSTRACT

Methods, systems, and devices for wireless communications are described. A communication device, which may be otherwise known as user equipment (UE), may receive a data transmission and determine a slot to transmit a hybrid automatic repeat request (HARQ) feedback based on the data transmission. The communication device may determine one or more HARQ feedback resources or one or more HARQ feedback resource sets in the slot to transmit the HARQ feedback, where the one or more hybrid automatic repeat request feedback resources or the one or more hybrid automatic repeat request feedback resource sets in the slot comprises a set of frequency resources associated with the slot, and transmit the HARQ feedback using the one or more HARQ feedback resources or the one or more HARQ feedback resource sets in the slot.

30 Claims, 19 Drawing Sheets

(58) Field of Classification Search
CPC . H04L 5/0026; H04L 5/14; H04L 2001/0093; H04L 5/0082; H04L 5/0091; H04L 5/0037; H04L 1/1812; H04L 1/1858; H04W 92/18; H04W 72/0446; H04W 72/0453; H04W 72/1263; H04W 72/20
See application file for complete search history.

(56) References Cited

U.S. PATENT DOCUMENTS

| | | | |
|---|---|---|---|
| 2019/0159194 | A1 | 5/2019 | Huang et al. |
| 2019/0387578 | A1* | 12/2019 | Shrestha ............... H04W 72/21 |
| 2020/0344722 | A1 | 10/2020 | He et al. |
| 2021/0084462 | A1 | 3/2021 | Hwang et al. |

OTHER PUBLICATIONS

Qualcomm Incorporated: "Physical Layer Procedures for Sidelink", 3GPP Draft, 3GPP TSG RAN WG1 #98, R1-1909257 Physical Layer Procedures for Sidelink, 3rd Generation Partnership Project (GPP), Mobile Competence Centre, 650, Route Des Lucioles, F-06921, Sophia-Antipolis Cedex, France, vol. RAN WG1 (Year: 2019).*
International Search Report and Written Opinion—PCT/US2020/048116—ISAEPO—dated Nov. 9, 2020.
ITL: "Physical Layer Procedure for NR V2X", 3GPP Draft, 3GPP TSG RAN WG1 #98, R1-1909117_V2X_PHY Procedure, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), XP051765720, 6 Pages, Retrieved from the Internet: URL: http://www.3gpp.org/ftp/tsg_ran/WG1_RL1/TSGR1_98/Docs/R1-1909117.zip, [retrieved on Aug. 16, 2019], Sections 1-4.
OPPO: "Physical Layer Procedure for NR-V2X Sidelink", 3GPP Draft, 3GPP TSG RAN WG1 #98, R1-1908364 Phy Layer Procedure, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), XP051764972, 13 Pages, Retrieved from the Internet: URL: http://www.3gpp.org/ftp/tsg_ran/WG1_RL1/TSGR1_98/Docs/R1-1908364.zip, [retrieved on Aug. 16, 2019], Sections 1-6.
Qualcomm Incorporated: "Physical Layer Procedures for Sidelink", 3GPP Draft, 3GPP TSG RAN WG1 #98, R1-1909257 Physical Layer Procedures for Sidelink, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 16, 2019 (Aug. 16, 2019), XP051765862, 17 Pages, Retrieved from the Internet: URL: http://www.3gpp.org/ftp/tsg_ran/WG1_RL1/TSGR1_98/Docs/R1-1909257.zip, [retrieved on Aug. 16, 2019], Sections 1-5, in particular 2.1.2 and 2.1.3, figures 6-7.
Huawei, et al., "Sidelink Physical Layer Structure for NR V2X", 3GPP TSG RAN WG1 Meeting #96bis, R1-1903943, Xi'an, China, Apr. 8-12, 2019, Apr. 12, 2019 (Apr. 12, 2019), 17 Pages, the Whole Document.
Huawei, et al., "Sidelink Physical Layer Procedures for NR V2X", 3GPP Draft, R1-1903944, 3GPP TSG RAN WG1 Meeting #96bis, 3rd Generation Partnership Project (3GPP), Mobile Competence Centre, 650, Route Des Lucioles, F-06921 Sophia-Antipolis Cedex, France, vol. RAN WG1, No. Xi' An, China, Apr. 8, 2019-Apr. 12, 2019, Apr. 2, 2019 (Apr. 2, 2019), XP051707059, 17 pages, Retrieved from the Internet: URL:http://www.3gpp.org/ftp/tsg%5Fran/WG1%5FRL1/TSGR1%5F96b/Docs/R1%2D1903944%2Ezip [retrieved on Apr. 2, 2019], p. 6, par. below Proposal 5.
U.S. Prosecution for the U.S. Appl. No. 62/838,042, filed Apr. 24, 2019, 33 pages.
U.S. Prosecution for the U.S. Appl. No. 62/842,075, filed May 2, 2019, 39 pages.
U.S. Prosecution for the U.S. Appl. No. 62/854,594, filed May 30, 2019, 38 pages.
U.S. Prosecution for the U.S. Appl. No. 62/854,618, filed May 30, 2019, 32 pages.
U.S. Prosecution for the U.S. Appl. No. 62/866,698, filed Jun. 26, 2019, 36 pages.
U.S. Prosecution for the U.S. Appl. No. 62/901,320, filed Sep. 17, 2019, 56 pages.

* cited by examiner

SIDELINK FEEDBACK TRANSMISSION AND FEEDBACK RESOURCE DETERMINATION

CROSS REFERENCE

The present application for patent claims the benefit of U.S. Provisional Patent Application No. 62/909,011 by WU et al., entitled "SIDELINK FEEDBACK TRANSMISSION AND FEEDBACK RESOURCE DETERMINATION," filed Oct. 1, 2019, assigned to the assignee hereof, and expressly incorporated by reference herein.

FIELD OF TECHNOLOGY

The following relates generally to wireless communications and more specifically to sidelink feedback transmission and feedback resource determination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or both. A sidelink is a communication link between similar devices. For example, a sidelink may support communications between multiple UEs (e.g., in a vehicle-to-everything (V2X) system, a vehicle-to-vehicle (V2V) system, a device-to-device (D2D) system, among other examples). In some examples, a sidelink may support unicast messaging, groupcast messaging, multicast messaging, broadcast messaging, or combinations thereof. In such systems, efficient power saving techniques may be desirable.

SUMMARY

The described techniques relate to improved methods, systems, devices, and apparatuses that support sidelink feedback transmission and feedback resource determination. Generally, the described techniques provide for efficient power saving techniques and reliable communications. The described techniques may enable a communication device, which may be a base station (e.g., eNodeB (eNBs), next-generation NodeB or giga-NodeB (any of which may be referred to as a gNB)) or a user equipment (UE) in a wireless communications system (e.g., a vehicle-to-everything (V2X) system, a vehicle-to-vehicle (V2V) network, a cellular V2X (C-V2X) network, a device-to-device (D2D) system, and the like) to transmit (or receive) a hybrid automatic repeat request (HARQ) feedback and determine HARQ feedback resource determination. For example, a communication device may receive (or transmit) a data transmission via sidelink and determine one or more HARQ resource sets in a slot to transmit (or receive) a HARQ feedback. The communication device may thus transmit (or receive) the HARQ feedback using the one or more HARQ resource sets in the slot. The communication device may, as a result, include features for improvements to power consumption, spectral efficiency, higher data rates and, in some examples, may promote enhanced efficiency for high reliability and low latency operations, among other benefits by supporting sidelink feedback transmissions and feedback resource determinations.

DETAILED DESCRIPTION

Figure 1:
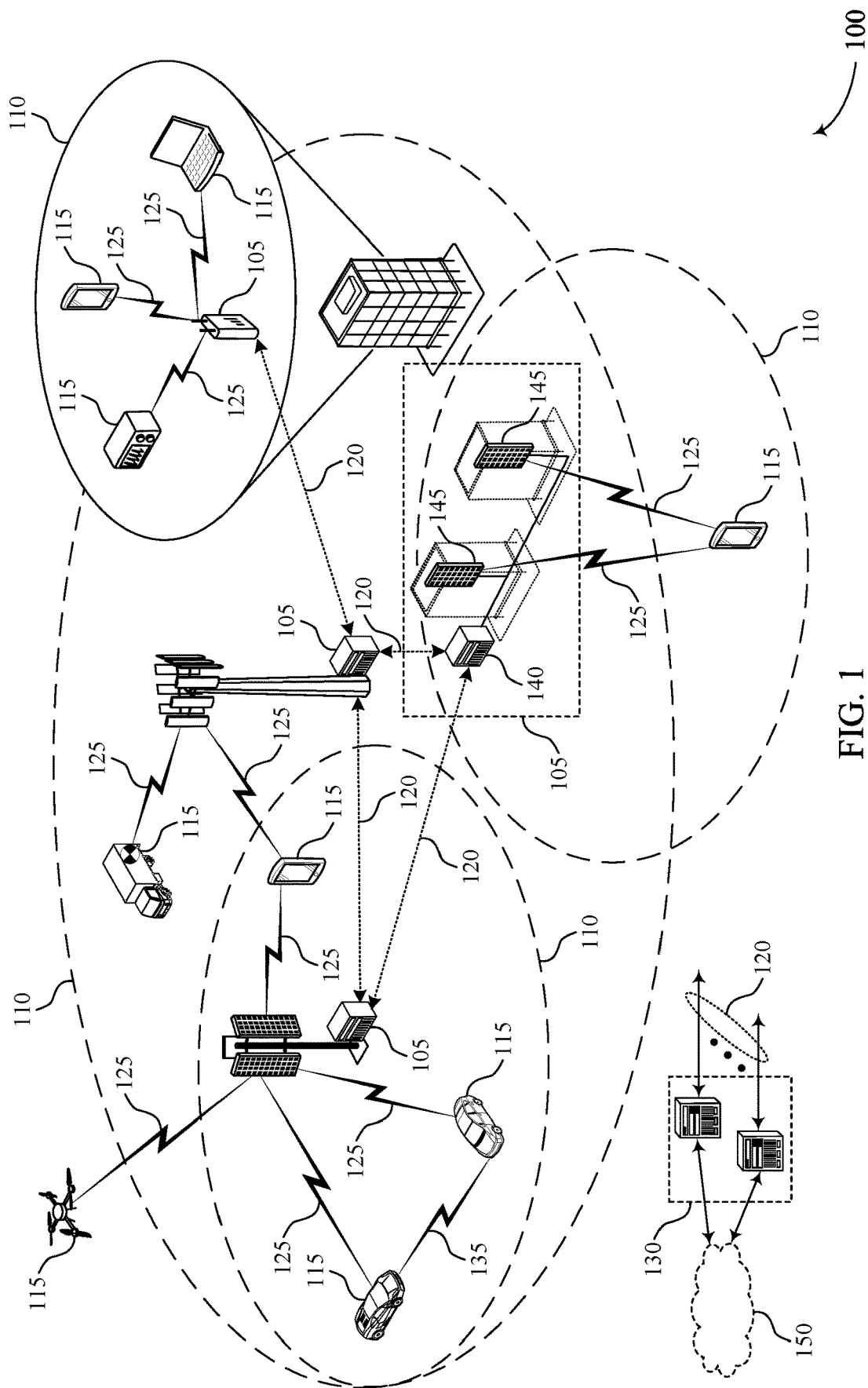
FIGS. 1 and 2 illustrate examples of wireless communications systems that support sidelink feedback transmission and feedback resource determination in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. For example, a UE may have information to transmit to the group of UEs (e.g., a detection of an object or obstacle on a road in a V2X system, scheduling information, among other examples) and the UE may initiate a sidelink communication including the information to the other UEs. The other UEs may monitor sidelink resource pools for the sidelink communication. In some cases, such monitoring for sidelink communications by UEs may be continuous to ensure sidelink transmissions are not missed, and the UEs may consume excess power as a result. In some other cases, various configurations of the UEs (e.g., configured by a Uu interface with a base station) may cause a UE to miss the sidelink communications due to failing to monitor the resource pools, which may result in unreliable communications.

In some examples, sidelink communication may support feedback transmission. For example, in sidelink groupcast or multicast communications, one or more of the UEs in the group of UEs may communicate hybrid automatic repeat request (HARQ) feedback to improve performance with the group. In sidelink unicast communications, a data receiver UE may transmit HARQ feedback so the data transmitter UE knows whether a packet has been successfully delivered. HARQ feedback may include a positive acknowledgment or a negative acknowledgement for sidelink communications, or both. For example, a UE in the group may transmit a data transmission to other UEs in the group, one or more of the other UEs may transmit a HARQ feedback (e.g., a positive acknowledgment or a negative acknowledgement) to indicate whether the data transmission was successfully received. In some examples, unlike communications via access links (e.g., a Uu interface between UEs and base stations), sidelink communications may be in a distributed manner.

That is, base stations may not be involved in sidelink communications because multiple UEs on the sidelink may receive a data transmission from a single UE, or a single UE may receive data transmissions from multiple UEs. It may be desirable to support feedback resource determination for sidelink feedback transmission, so that UEs know where to transmit feedback (e.g., HARQ feedback), as well as where to receive the feedback. For example, different UEs capable of sidelink communications may have different UE capability, quality-of-service (QoS) of traffic, etc., and may demand different feedback timing (e.g., a UE with a larger capability may transmit feedback more promptly than a UE with a smaller capability). As described herein, UEs capable of sidelink communications may experience power saving for sidelink communications, such as reduced power consumption and extended battery life while ensuring reliable and efficient communications in the group of UEs, and feedback transmissions related to different data transmissions may be multiplexed to avoid collisions in sidelink communications.

As described herein, a UE may receive a data transmission (e.g., scheduling information, among other examples) from one or more other UEs. For example, a UE may receive a data transmission on a physical shared channel, which may be a physical sidelink shared channel (PSSCH). The UE may, based on receiving the data transmission, determine a slot to transmit a HARQ feedback. In some examples, the UE may determine one or more HARQ resources or one or more HARQ resource sets in the slot to transmit the HARQ feedback. For example, the UE may determine a resource location of the one or more HARQ resources or the one or more HARQ resource sets in the slot based on one or more of a starting frequency resource of the data transmission, a starting frequency resource of a transmission of a control channel associated with the data transmission, an ending timing resource of a physical sidelink control channel (PSCCH), a subchannel index of a PSSCH, or a subchannel index of the PSCCH. The UE may, therefore, transmit the HARQ feedback using the one or more HARQ resources or the one or more HARQ resource sets in the slot.

Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency sidelink communications, among other examples, in accordance with sidelink feedback transmission and feedback resource determination. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are then illustrated by and described with reference to resource grids that relate to sidelink feedback transmission and feedback resource determination. Aspects of the disclosure are further illustrated by and described with reference to apparatus diagrams, system diagrams, and flowcharts that relate to sidelink feedback transmission and feedback resource determination in wireless communications systems.

FIG. 1 illustrates an example of a wireless communications system 100 that supports sidelink feedback transmission and feedback resource determination in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
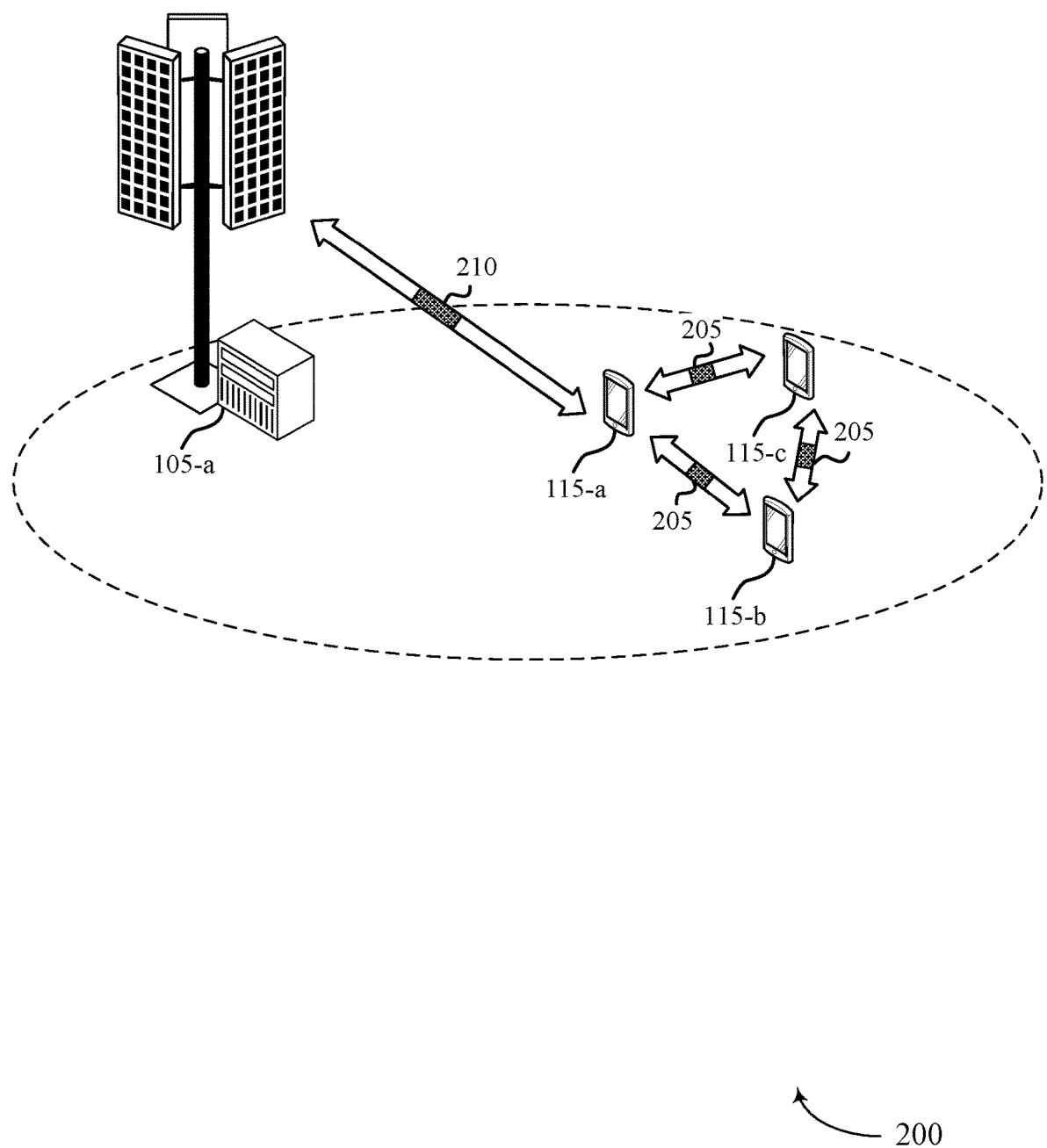

FIG. 2 illustrates an example of a wireless communications system 200 that supports sidelink feedback transmission and feedback resource determination in accordance with aspects of the present disclosure. In some examples, the wireless communications system 200 may implement aspects of the wireless communication system 100 and may include a base station 105-a and a group of UEs 115 (e.g., UE 115-a through UE 115-c), which may be examples of a base station 105 and UEs 115, respectively, described with reference to FIG. 1. In some cases, the group of UEs 115 may communicate with each other (e.g., within a V2X system, a D2D system, and the like) and may employ sidelink feedback transmission and feedback resource determination operations to save power and ensure reliable communications.

According to some aspects, the group of UEs 115 may communicate with each other (or with another group of UEs 115) over sidelink communications 205 (e.g., using a peer-to-peer (P2P) or D2D protocol). For example, a UE 115-a may monitor resource pools for the sidelink communications 205 or indications of the sidelink communications 205 (e.g., resource reservations, control channel transmissions, among other examples) from other UEs 115 in the group. Additionally or alternatively, the UEs 115 may have data to transmit to (or receive from) one or more of the UEs 115 in the group and may use the sidelink communications 205 to transmit the data transmission. In some examples, the group of UEs 115 may utilize sidelinks (e.g., the sidelink communications 205) in addition to access links with the base station 105.

For example, one or more of the UEs 115 may be in a coverage area (e.g., a coverage area 110 with reference to FIG. 1) of the base station 105. In such examples, a UE 115 may communicate with the base station 105 via a Uu interface (e.g., the base station 105 may transmit downlink communications to one or more of the UEs 115 via an access link 210). In some other examples, the group of UEs 115 may not be inside the coverage area or may not communicate with the base station 105 using an access link. In some cases, the UEs 115 may be configured with one or more resource pools for the sidelink communications 205. For example, the UEs 115 may be configured with one or more resource pools for sidelink feedback transmission (e.g., HARQ feedback) and feedback resource determination (e.g., HARQ feedback resources, (e.g., HARQ feedback resource sets). An example of resource grid is described with reference to FIG. 3.

Figure 3:
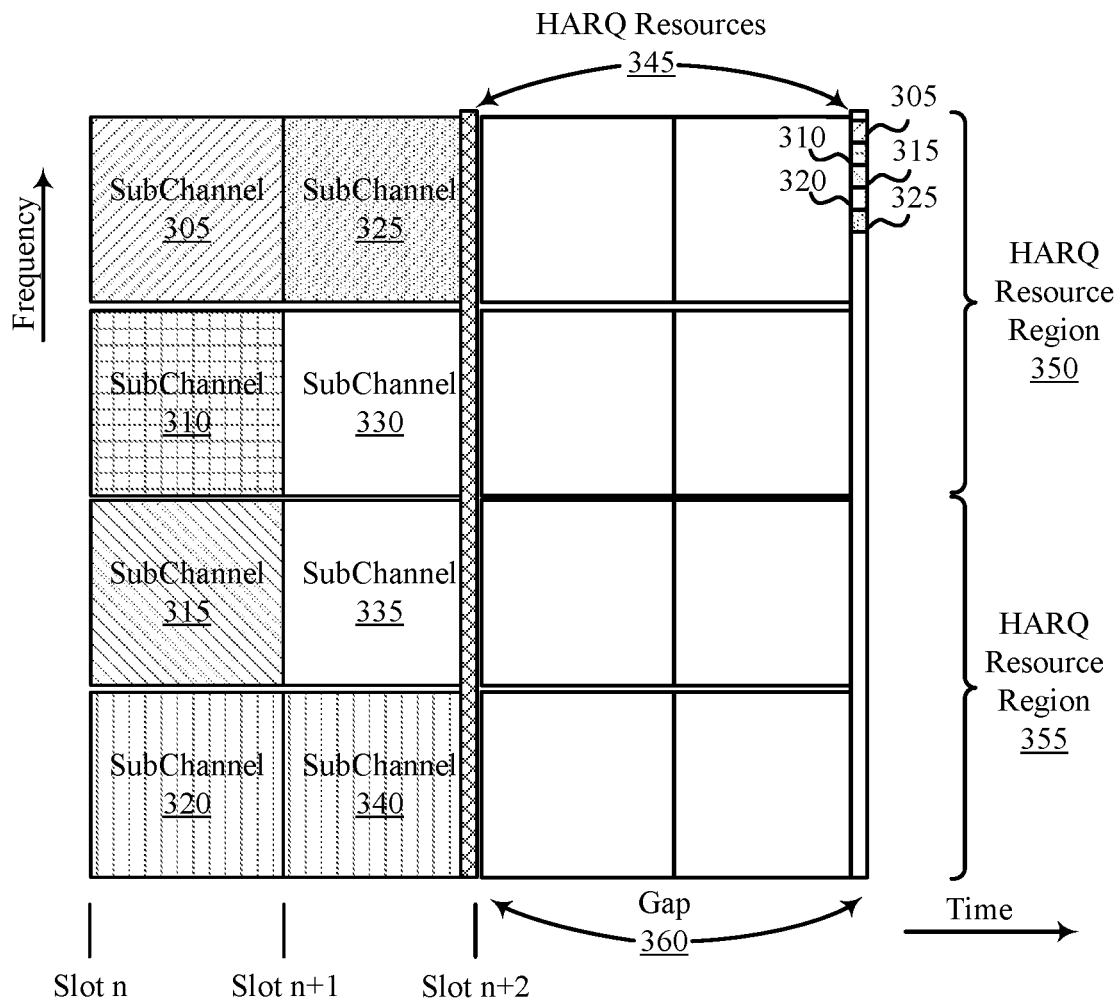
FIGS. 3 through 9 illustrate examples of resource grids that supports sidelink feedback transmission and feedback resource determination in accordance with aspects of the present disclosure.

FIG. 3 illustrates an example of a resource grid 300 that supports sidelink feedback transmission and feedback resource determination in accordance with aspects of the present disclosure. The resource grid 300 may implement aspects of the wireless communication systems 100 and 200, respectively, described with reference to FIGS. 1 and 2. In some examples, the resource grid 300 may correspond to a resource pool, which may be a function of a frequency domain as well as a time domain. For example, the resource grid 300 may span a number of slots n (e.g., slot n, slot n+1, slot n+2, . . . , etc.) in a time domain, and may span a number of subchannels (e.g., subchannels 305 through 340) in a frequency domain. In some examples, resources of the resource grid 300 may span one symbol by one subcarrier, or one symbol by multiple subcarriers.

The resource grid 300 may include one or more HARQ resources 345, which may correspond to one or more physical sidelink feedback channel (PSFCH) resources. In some examples, the one or more PSFCH resources within the number of slots n (e.g., slot n, slot n+1, slot n+2, . . . , etc.) in the resource grid 300 may be preconfigured periodically within a period of n slots. The number of slots n may be configurable to a value. For example, the number of slots n may be configurable to be one, two, or four. In some examples, for a data transmission over an ending symbol in a slot n, when the corresponding HARQ feedback may be due for transmission, the HARQ feedback may be expected to be in a slot n+α, where a is a smallest integer greater than or equal to K with the condition that the slot n+α includes HARQ resources, where K is a feedback timing value. In some examples, the one or more HARQ resources 345 may be associated with one or more of a HARQ resource region 350 or a HARQ resource region 355. The HARQ resource region 350 may correspond to HARQ resources for odd numbered transmitter UEs, while the HARQ resource region 355 may correspond to HARQ resource for even numbered transmitter UEs. The resource grid 300 may also include a gap 360, which may be a system wide PSSCH gap.

Figure 4:
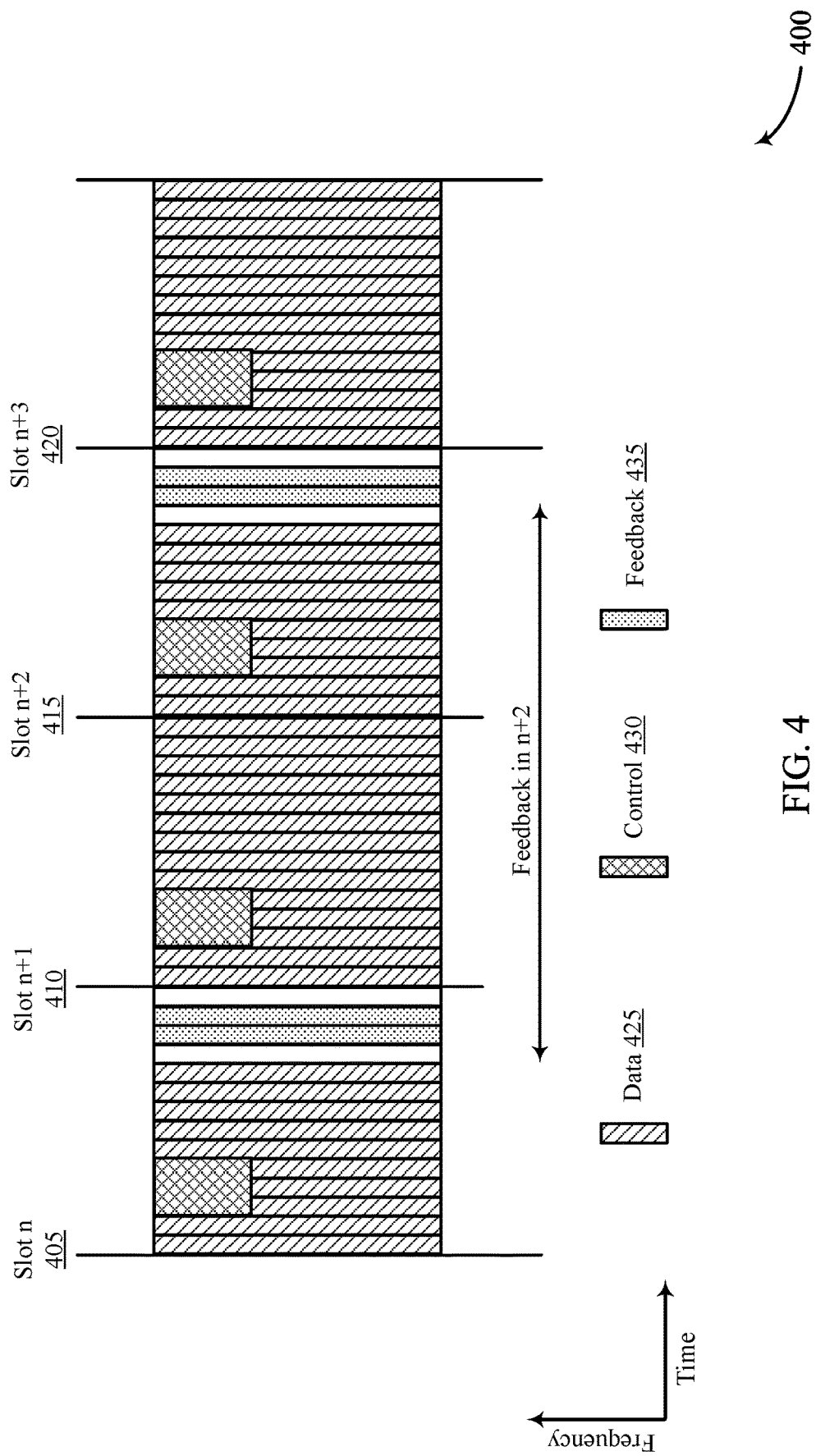

FIG. 4 illustrates an example of a resource grid 400 that supports sidelink feedback transmission and feedback resource determination in accordance with aspects of the present disclosure. The resource grid 400 may implement aspects of the wireless communication systems 100 and 200, respectively, described with reference to FIGS. 1 and 2. In some examples, the resource grid 400 may correspond to a resource grid, which may be a function of a frequency domain, as well as a time domain. For example, the resource grid 400 may span a number of slots n, such as slot (n) 405, slot (n+1) 410, slot (n+2) 415, and slot (n+3) 420. Each slot may include a number of time and frequency resources for one or more of data transmissions 425, control transmissions 430, or feedback transmissions 435. For example, each slot n may have a number of symbols and subcarriers. In the example of FIG. 4, the resource grid 400 may correspond to a feedback transmission timeline for slot (n+2), where K is two. That is, with reference to FIG. 2, a UE 115 may transmit a HARQ feedback at slot (n+2).

Returning to FIG. 2, in some examples, the UE 115-*a* may receive a data transmission from another UE 115 in the group of UEs, and determine a slot to transmit a feedback (e.g., a HARQ feedback) based on the received data transmission. For example, the UE 115-*a* may receive the data transmission on a physical shared channel from the UE 115-*b*, which may be a PSSCH. In some examples, the UE 115-*a* may determine the slot, as described in FIGS. 2 and 3, for example, based on one or more of a slot n value and a feedback timing value K. The UE 115-*a*, upon determining the slot to transmit the feedback (e.g., a HARQ feedback), may determine one or more feedback resources (e.g., HARQ feedback resources) or one or more feedback resource sets (e.g., HARQ feedback resource sets) in the slot to transmit the feedback. For example, the UE 115-*a* may determine a resource location of the one or more feedback resources or the one or more feedback resource sets in the slot. That is, the UE 115-*a* may determine a location of one or more HARQ resources for transmitting the HARQ feedback in the slot, which may be a PSFCH slot. In some examples, the UE 115-*a* may determine the location of one or more HARQ resources based on one or more of a starting frequency resource of the data transmission, a starting frequency resource of a transmission of a control channel associated with the data transmission, an ending timing resource of a PSSCH, a subchannel index of the PSSCH, or a subchannel index of the PSCCH.

The UE 115-*a* may, additionally or alternatively, determine the resource location of the one or more feedback resources (e.g., HARQ feedback resources) or the one or more feedback resource sets (e.g., HARQ feedback resource sets) in the slot based one or more of a UE identifier associated with the UE 115-*a* or a UE identifier associated with the UE 115-*b* that transmitted the data transmission. In some examples, the UE 115-*a* may receive sidelink control information carrying the UE identifier from the UE 115-*b*. In some examples, the UE identifiers may be a layer one identifier, a group identifier, or an upper layer identifier.

The UE 115-*a* may transmit a feedback (e.g., a HARQ feedback), to the UE 115-*b*, using the one or more feedback resources or the one or more feedback resource sets in the slot. In some examples, the UE 115-*a* may decode one or more of a control portion or a data portion of the data transmission, and transmit, after decoding one or more of the control portion or the data portion of the data transmission, the feedback using the one or more feedback resources or the one or more feedback resource sets in the slot. In complement, the UE 115-*b* may detect one or more resources or one or more resource sets in a slot to receive the feedback. For example, the UE 115-*b* may detect PSFCH in the detected one or more feedback resources or one or more feedback resource sets, after transmitting the data transmission (e.g., the control portion or the data portion of the data transmission (e.g., sidelink transmission)). In some examples, there may be one or more feedback resource sets associated with a symbol in a slot. For example, there may be one or more HARQ feedback resource sets (also referred to as PSFCH resource sets) associated with a PSFCH symbol in a PSFCH slot. Example of resource grids are described with reference to FIGS. 5 and 6.

Figure 5:
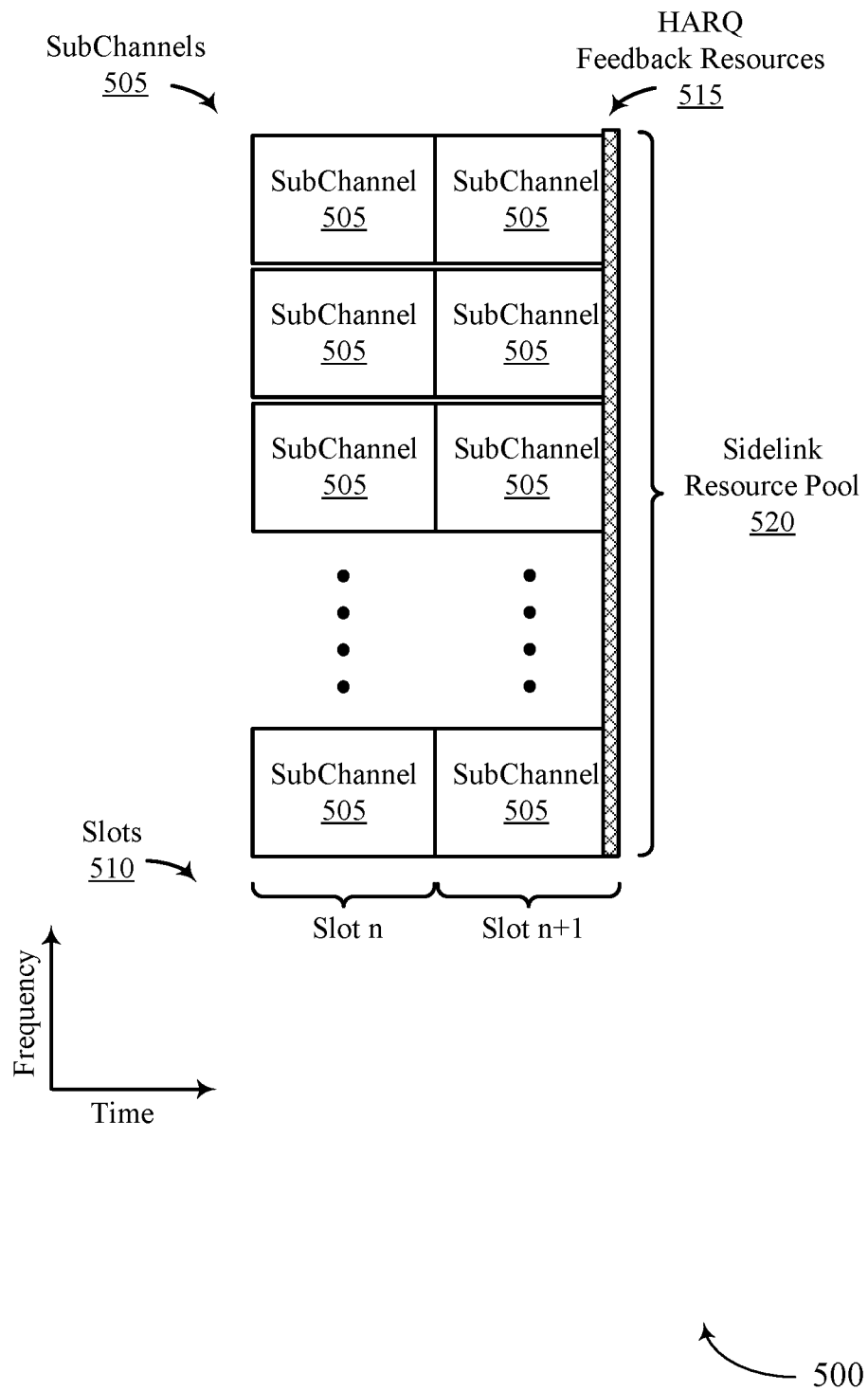

FIG. 5 illustrates an example of a resource grid 500 that supports sidelink feedback transmission and feedback resource determination in accordance with aspects of the present disclosure. The resource grid 500 may implement aspects of the wireless communication systems 100 and 200, respectively, described with reference to FIGS. 1 and 2. In some examples, the resource grid 500 may correspond to a resource pool, which may be a function of a frequency domain and a time domain. For example, the resource grid 500 may span a number of subchannels 505 in a frequency domain and may span a number of slots 510 in a time domain. Each slot may include one or more symbols. Each subchannel 505 may include one or more resource blocks, or a certain number of subcarriers. In some examples, a subchannel 505 may span one symbol by one subcarrier. In some other examples, a subchannel 505 may span one symbol by multiple subcarriers.

In the example of FIG. 5, the resource grid 500 may include resources for feedback, such as HARQ feedback resources 515. These resources may belong to a sidelink resource pool 520. As illustrated, the HARQ feedback resources 515 may cover all frequency resources in one or more OFDM symbols (e.g., a PSFCH symbol) of a slot having PSFCH resources may be referred to as a PSFCH. That is, HARQ feedback candidates span the entire sidelink resource pool 520. With reference to FIG. 2, in some examples, one or more of the UEs 115 may be configured with the resource grid 500, for example, via an RRC configuration or RRC signaling. As a result, the UEs 115 may communicate data transmission, control information, and feedback via sidelink communications, in accordance with the resource grid 500.

Figure 6:
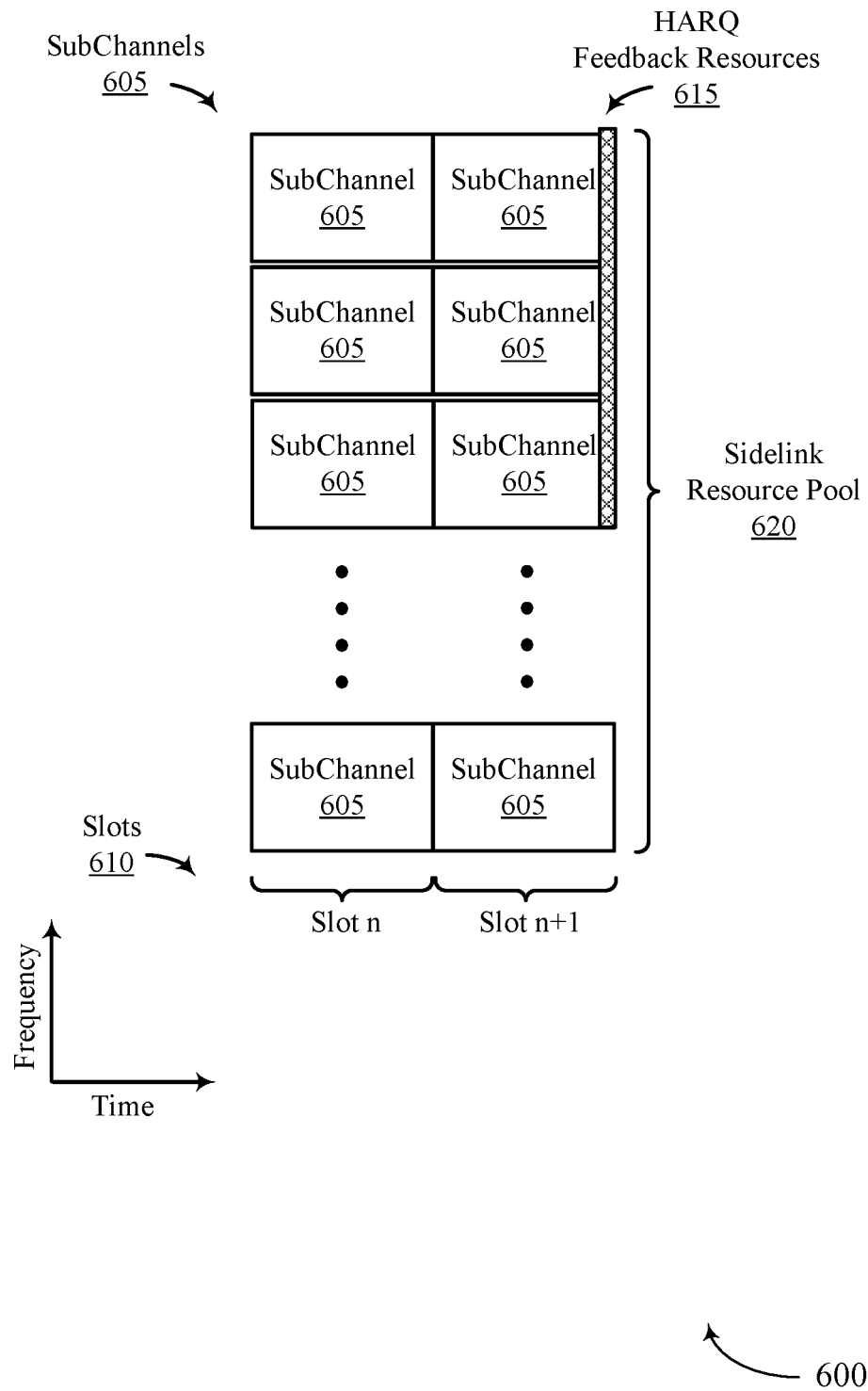

FIG. 6 illustrates an example of a resource grid 600 that supports sidelink feedback transmission and feedback resource determination in accordance with aspects of the present disclosure. The resource grid 600 may implement aspects of the wireless communication systems 100 and 200, respectively, described with reference to FIGS. 1 and 2. In some examples, the resource grid 600 may correspond to a resource pool, which may be a function of a frequency domain and a time domain. For example, the resource grid 600 may span a number of subchannels 605 in a frequency domain and may span a number of slots 610 in a time domain. Each slot may include one or more symbols. In some examples, a subchannel 605 may span one symbol by one subcarrier. In some other examples, a subchannel 605 may span one symbol by multiple subcarriers.

In the example of FIG. 6, the resource grid 600 may include resources for feedback, such as HARQ feedback resources 615. These resources may belong to a sidelink resource pool 620. As illustrated, the HARQ feedback resources 615 may cover a subset of frequency resources in the resource pool 620, in one or more OFDM symbols of a PSFCH slot. HARQ feedback candidates may thus span a portion of the sidelink resource pool 520. When a HARQ resource set spans a portion of the resource pool 620, there may be multiple HARQ resource sets, each HARQ resource set may span a subset of frequency resources in the symbol (e.g., a PSFCH symbol) or, there may be one HARQ resource set in a PSFCH slot, and the frequency resources that do not belong to the HARQ resource set may be reserved for other purpose. With reference to FIG. 2, in some examples, one or more of the UEs 115 may be configured with the resource grid 600, for example, via an RRC configuration or RRC signaling. As a result, the UEs 115 may communicate data transmission, control information, and feedback via sidelink communications, in accordance with the resource grid 600.

Returning to FIG. 2, in some examples, when the UEs 115 are configured with multiple feedback resource sets (e.g., HARQ resource sets), the UEs 115 may also be configured to use different feedback resource sets according to one or more feedback modes (e.g., HARQ feedback modes), one or more feedback types (e.g., HARQ feedback types), or one or more feedback timing values (e.g., K). Here, the UEs 115 may determine a feedback resource set (e.g., a HARQ resource set), and determine a feedback resource in the feedback resource set based on a defined or configured rule. In some examples, the UEs 115 may be configured with multiple candidate feedback resource sets, which the UEs 115 may use for different feedback modes or different feedback types. For example, the UEs 115 may be configured with a feedback mode in which the UEs 115 exclusively transmits negative acknowledgments. That is, the UEs 115 exclusively transmit feedback when the feedback is a negative acknowledgment (i.e., a negative acknowledgment (NACK)-only feedback mode). In some other examples, the UEs 115 may be configured with a feedback mode in which the UEs 115 transmit one or more of a positive acknowledgement or a negative acknowledgment. In other words, the UEs 115 may be configured to transmit either a positive acknowledgement or a negative acknowledgment based on a successful reception (or a failed reception) of a data transmission (i.e., a positive acknowledgement (ACK)/NACK feedback mode). Similarly, the UEs 115 may be configured with a feedback type in which the UEs 115 transmit one or more of the positive acknowledgement or the negative acknowledgment. In other words, the feedback type may be either an ACK type feedback or a NACK type feedback.

In some examples, each feedback resource set of a number of feedback resource sets may be configured for a feedback mode or a feedback type. The UEs 115 may be configured with a mapping rule, which may apply to the different feedback modes or feedback types. For example, for each data transmission (e.g., a PSSCH transmission), there may be a corresponding PSFCH resource in each feedback resource set. The UEs 115 may transmit the feedback exclusively in one of feedback resource sets determined by the feedback mode or the feedback type. In some examples, the HARQ feedback may be carried by a sequence, e.g., a quadrature phase shift keying (QPSK) modulation sequence, a computer-generated sequence (CGS), a low peak-to-average power ratio (PAPR) sequence, etc. The HARQ feedback corresponding to different feedback modes or feedback types may, in some examples, be unique. For example, when a data receiver UE transmits HARQ feedback, one or more of the feedback modes or the feedback types may correspond to different sequences. In some other examples, when a data receiver UE transmits HARQ feedback, one or more of the feedback modes or the feedback types may correspond to a sequence with different cyclic shifts. In other examples, when a data receiver UE transmits HARQ feedback, one or more of the feedback modes or the feedback types may correspond to a sequence with different cover codes. The UEs 115 may thus determine one or more of the feedback mode, the feedback type, or the feedback timing value based on the data transmission, and determine one or more feedback resources or the one or more feedback resource sets in the slot to transmit the feedback based on one or more of the feedback mode, the feedback type, or the feedback timing value.

The UEs 115 may, in some examples, determine a feedback resource (e.g., a HARQ resource) based on one or more of a time resource location or a frequency location of a data channel associated with the data transmission. For example, the time resource location may correspond to an ending slot of the data transmission, while the frequency resource location may correspond to a beginning subchannel of the data channel associated with the data transmission or a subchannel for a corresponding PSCCH. In other words, the frequency resource used for the feedback transmission (e.g., the HARQ transmission) may be uniquely determined by the time and frequency location of the data transmission. In some other examples, UEs 115 may determine a HARQ resource set first, for example, based on a HARQ feedback mode, a HARQ feedback type, a HARQ feedback timing, or a HARQ resource set configuration. The UEs 115 may then determine a HARQ feedback resource in the HARQ resource set, based on one or more of a time resource location or a frequency location of a data channel associated with the data transmission, as described herein.

In some examples, feedback (e.g., HARQ feedback) associated with different data channels may be frequency division multiplexed. For example, PSCCHs for the different data channels may be transmitted on different subchannels (e.g., different frequency locations) and/or a subchannel index may be same but an ending slot of the PSSCH transmission may be different (e.g., different time location). The UEs 115 may determine a frequency resource location of a feedback resource within a feedback resource set to transmit a feedback transmission according to the following equation:

$$q = m_L \times M_K + m_K \quad (1)$$

where $m_L$ is the index of an ending slot having a PSSCH transmission, $m_L=0, 1, 2, \ldots, M_L-1$. The subchannel index $m_K$ denotes the frequency location of PSSCH (the subchannel for PSCCH transmission or the first subchannel of the PSSCH), so $m_K=0, 1, 2, \ldots, M_K-1$. $M_K$ may correspond to a quantity of subchannels associated with the one or more feedback resources or the one or more feedback resource sets in the slot, e.g., a quantity of subchannels in the resource pool. According to equation (1), the UEs 115 may map feedbacks to transmissions from a same slot to consecutive frequency resources. Alternatively, in some examples, the UEs 115 may determine a frequency resource location of a feedback resource within a feedback resource set to transmit a feedback according to the following equation.

$$q = m_K \times M_L + m_L \quad (2)$$

According to equation (2), the UEs 115 may map HARQ feedbacks to transmissions from a same subchannel within a feedback period may be mapped to consecutive frequency resources. Here, $m_K$ may correspond to a subchannel index associated with a frequency resource location of the PSSCH, $M_L$ may correspond to a quantity of slots associated with the one or more feedback resources or the one or more feedback resource sets in the slot, and $m_L$ corresponds to an index of a last slot associated with a PSSCH. In some other examples, an offset parameter may be configured to determine HARQ feedback resource. For example, the HARQ feedback resource location may be determined as $q = K_{offset} + m_L \times M_K + m_K$, where $K_{offset}$ is an offset parameter with integer values. An example of resource grid is described with reference to FIG. 7.

Figure 7:
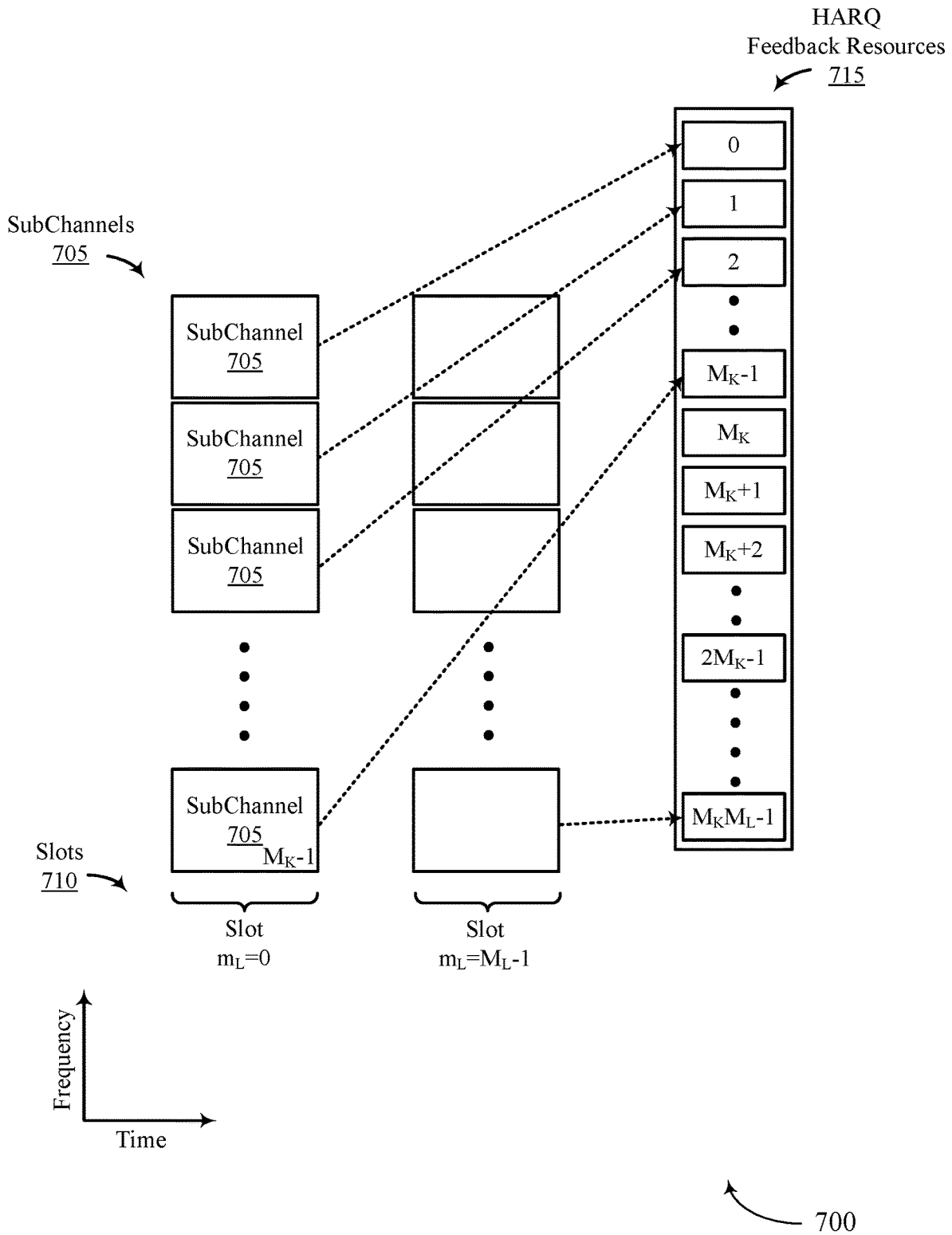

FIG. 7 illustrates an example of a resource grid 700 that supports sidelink feedback transmission and feedback resource determination in accordance with aspects of the present disclosure. The resource grid 700 may implement aspects of the wireless communication systems 100 and 200, respectively, described with reference to FIGS. 1 and 2. In some examples, the resource grid 700 may correspond to a resource pool, which may be a function of a frequency domain and a time domain. For example, the resource grid 700 may span a number of subchannels 705 in a frequency domain and may span a number of slots 710 in a time domain. Each slot may include one or more symbols. In some examples, a subchannel 705 may span one symbol by one subcarrier. In some other examples, a subchannel 705 may span one symbol by multiple subcarriers.

In the example of FIG. 7, the resource grid 700 may include resources for feedback, such as HARQ feedback resources 715. These resources may belong to a sidelink resource pool, which may have a bandwidth of certain number of resource blocks, which may form $M_K$ subchannels (indexed 0, 1, 2, ..., $M_K-1$). In some examples, candidate feedback resource sets may have a periodicity of $M_L$ slots, which may be the same as PSFCH periodicity, (i.e., $M_L=N$). In some examples, the periodicity of $M_L$ slots may be greater than the PSFCH periodicity (e.g., $M_L > N$). A data transmission may span one or multiple subchannels, and one or multiple slots. In other words, a candidate feedback resource set may have to accommodate $M_K \times M_L$ feedbacks. In this example, the candidate feedback resources set has $M_L M_K$ PSFCH resources, so $M_L M_K$ feedbacks can be multiplexed in a frequency division multiplexed manner. With reference to FIG. 2, in some examples, one or more of the UEs 115 may be configured with the resource grid 700, for example, via an RRC configuration or RRC signaling. As a result, the UEs 115 may communicate data transmission, control information, and feedback via sidelink communications, in accordance with the resource grid 700.

Returning to FIG. 2, in some examples, the feedback associated with different data channels of a same slot may be frequency division multiplexed. In some other examples, feedback transmission associated with different data channels having a same frequency location but in different slot (within feedback period) may be code division multiplexed. That is, for two data transmissions having a same frequency location (e.g., a starting subchannel) but different time location (e.g., an ending slot), the UEs 115 may transmit the feedback (e.g., HARQ feedbacks) in a same frequency resource. The two feedbacks are code division multiplexed. For example, sequence(s) may be used to convey feedback information. Use of code division multiplexing means either different sequences are used, or same sequence but different cyclic shifts or cover codes are applied to the sequence. Therefore, when there are $M_K$ subchannels in a sidelink resource pool, at least $M_K$ frequency feedback resources may be used.

The UEs 115 may, additionally or alternatively, determine one or more feedback resources (e.g., HARQ feedback resources) based on one or more UE identifiers. For example, the UE 115-a may determine one or more feedback resources (e.g., HARQ feedback resources) based on one or more of a UE identifier associated with the UE 115-a or a UE identifier associated with the UE 115-b (e.g., associated with the data transmission). The frequency resource used for feedback (e.g., HARQ feedback) may also be determined based on the UE identifiers. For example, different HARQ feedback resources may be determined for data transmissions having different transmitter UE identifiers associated and/or different HARQ feedback resources may be determined by different receiver UEs receiving the same data transmission.

In some examples, a transmitter UE identifier may be used for feedback resource determination (e.g., PSFCH feedback resource determination). This UE identifier may be a layer one identifier, which can be conveyed in sidelink control information. As such, when multiple transmissions having a same time and/or frequency location, the feedback transmission may be differentiated by feedback resource location, which is determined by the transmitter UE identifier. For example, for a certain time and/or frequency location of a data transmission (e.g., a PSSCH transmission), there may be multiple corresponding feedback resources (e.g., PSFCH resources), which one to be used is determined from transmitter UE identifier. For example, $Q_M$ HARQ feedback resources in a PSFCH slot correspond to a time and/or frequency location of PSSCH, with index $0, 1, \ldots, Q_M-1$. The determined PSFCH resource may have an index mod (ID, $Q_M$), where mod( ) is a modulo operation and ID is transmitter UE identifier.

In some other examples, a receiver UE identifier may be used for feedback resource determination (e.g., PSFCH resource determination). Similarly, the UE identifier may be a layer one identifier. Additionally or alternatively, the receiver UE identifier may be a group identifier (e.g., in groupcast communications) or an upper layer identifier. So when multiple UEs 115 are receiving a same data transmission, the feedback transmission from different UEs 115 may be transmitted on different feedback resources (e.g., frequency division multiplexed). For a certain time and/or frequency location of a data transmission (e.g., a PSSCH transmission), there may be multiple corresponding PSFCH resources, which one to be used may be determined from the receiver UE identifier. For example, $Q_M$ HARQ resources in a PSFCH slot correspond to a time and/or frequency location of PSSCH, with index 0, 1, . . . , $Q_M-1$. The determined PSFCH resource may have an index mod(ID, $Q_M$), where mod( ) is modulo operation and ID is a receiver UE identifier. As such, when multiple receiver UEs are sending feedback, the data transmitter UE may be able to differentiate the feedbacks from different UEs. In some examples, both a receiver UE identifier and a transmitter UE identifier may be used for feedback resource determination.

In a specific example, feedback (e.g., HARQ feedback) associated with different data channels may be frequency division multiplexed. For example, PSCCHs for the different data channels may be transmitted on different subchannels (e.g., different frequency locations) and/or a subchannel index may be same but an ending slot of the PSSCH transmission may be different (e.g., different time location). Feedback from multiple UEs 115 for the same data transmission may also be frequency division multiplexed. For data a receiver UE with identifier ID, the UEs 115 may determine a frequency resource location of a feedback resource within a feedback resource set to transmit a feedback transmission according to the following equation:

$$q = \text{mod}(ID, Q_M) + m_L \times M_K + m_K \quad (3)$$

where $m_L$ is the index of an ending slot having a PSSCH transmission, $m_L = 0, 1, 2, \ldots, M_L - 1$. The subchannel index $m_K$ denotes the frequency location of PSSCH (the subchannel for PSCCH transmission or the first subchannel of the PSSCH), so $m_K = 0, 1, 2, \ldots, M_K - 1$. $M_K$ may correspond to a quantity of subchannels associated with the one or more feedback resources or the one or more feedback resource sets in the slot, e.g., a quantity of subchannels in the resource pool. According to equation (1), the UEs 115 may map feedbacks to transmissions from a same slot to consecutive frequency resources.

In some examples, the UEs 115 may participate in groupcast communications. The UEs 115 may, in some examples, be configured to support HARQ feedback for a positive acknowledgment, or a negative acknowledgment for groupcast). In this example, a receiver UE may transmit feedback (e.g., HARQ feedback) including a positive acknowledgment or a negative acknowledgment. Alternatively, multiple receiver UEs may receive a same data transmission and transmit feedbacks. In groupcast communications, at least two feedback resource sets may be configured, one for a positive acknowledgment and one for a negative acknowledgment. A receiver UE may transmit a positive acknowledgment or a negative acknowledgment exclusively in positive acknowledgment (or negative acknowledgment) resource sets (e.g., HARQ resource sets).

In some examples, sequences are used to carry feedback information. For a feedback type (e.g., a positive or a negative acknowledgment), sequence transmitted by different UEs 115 for a same data transmission may be the same. That is, there is no need to differentiate feedbacks from different receiver UEs based on sequence. In these examples, the HARQ resource used by different receiver UEs to transmit feedbacks for a certain feedback type for a same data transmission may also be the same; for example, Equation (1) may be used to determine feedback resource for the data transmission. In some other examples, sequences are used to carry feedback information. For a feedback type (e.g., a positive or a negative acknowledgment), sequence transmitted by different UEs 115 may be different. That is, sequences may be different (e.g., receiver UE identifier may be a parameter used to generate the sequence) or the sequence may be the same, but different cyclic shifts or cover codes may be applied to the sequence, depending on the receiver UE identifier. So, for a data transmission, the data transmitter UE may be able to differentiate feedbacks from different receiver UEs for different feedback types. In these examples, the HARQ resource used by different receiver UEs to transmit feedbacks for a certain feedback type may also be the same; for example, Equation (1) may be used to determine feedback resource for the data transmission, for a certain feedback type in that feedback type resource set. In some examples, positive acknowledgments from different receiver UEs may be frequency division multiplexed (e.g., as mentioned, receiver UE ID is used to determine feedback resource). In some examples, negative acknowledgments from different receiver UEs may be exclusively differentiated (e.g., code division multiplexed or frequency division multiplexed), while positive acknowledgments may not. In some examples, positive acknowledgments from different receiver UEs may be exclusively differentiated (e.g., code division multiplexed or frequency division multiplexed), while negative acknowledgments may not. In other examples, neither negative acknowledgments and/or positive acknowledgments from different receiver UEs may be differentiated.

Returning to FIG. 2, in some examples, there may not be explicit configuration of multiple feedback resource sets (e.g., as in some examples, different feedback resource set for different feedback modes or feedback types), however, the determination of a feedback resource for a data transmission may take into account the feedback mode or feedback type, such that for a different feedback mode (e.g., NACK-only mode or ACK/NACK mode) or different feedback type (positive acknowledgement or negative acknowledgement), the determined feedback resource would be different. For example, the system may desire that feedbacks for different feedback type use different feedback resources; when the UEs 115 determine a feedback resource, the UEs 115 may consider the feedback type, so for different feedback types (e.g., whether it is a positive or negative acknowledgement), the determined PSFCH resource would be different. For example, the UEs 115 may determine a resource location based on the following equation:

$$q = q_{shift, A/N} + m_L \times M_K + m_K \quad (4)$$

where $q_{shift, A/N} = 0$ for negative acknowledgement and $q_{shift, A/N} = M_K \times M_L$ for positive negative acknowledgement. As such, when the feedback type is different, the determined feedback resource would be different. The wireless communications system 200 may therefore enable UEs 115 to transmit (or receive) sidelink feedback and determine feedback resource determination. In other examples, the system may desire that feedbacks for different feedback mode use different feedback resources; when the UEs 115 determine a feedback resource, the UEs 115 may consider the feedback mode, so for different feedback modes (e.g., whether it is NACK-only mode or ACK/ACK mode), the determined PSFCH resource would be different.

Each feedback resource in a slot (e.g., a PSFCH slot) may have a corresponding feedback timing value (e.g., K value). In some examples, the UE 115-*a* may receive a data transmission from the UE 115-*b*. The UE 115-*a* may determine a feedback timing value based on the data transmission, and determine a feedback resource set in a resource pool associated with one or more slots based on the feedback timing value. The UE 115-*a* may, as a result, transmit a feedback transmission using the feedback resource set associated with the one or more slots and corresponding to the feedback timing value. Thus, a sidelink data receiver UE may transmit a corresponding feedback transmission on a resource (e.g., PSFCH resource), which may have a same feedback timing value (e.g., K value) as that associated to the data transmission. Similarly, a sidelink data transmitter UE may receive a corresponding feedback transmission on a feedback resource (e.g., HARQ resource), which may have a same feedback timing value (e.g., K value) as that associated to the data transmission.

In some examples, in a sidelink resource pool, there may be multiple feedback resource sets (e.g., multiple HARQ resource sets), which may be configured or preconfigured when there are multiple feedback timing values (e.g., K values). In some examples, these feedback resource sets may be frequency division multiplexed. In a feedback slot (or a subset of feedback slots), there may be multiple feedback resource sets, each feedback resource set may have a specific feedback timing value (e.g., K value) associated with it. In some other examples, these feedback resource sets may be time division multiplexed. That is, one or more slots including HARQ resources for feedback may be associated to a certain feedback timing value (e.g., K value), while in one or more other slots including other HARQ resources may be associated to different feedback timing value (e.g., K value). In other examples, the feedback resources may be frequency division multiplexed or time division multiplexed.

In some examples, in a sidelink resource pool, there may be multiple feedback resources sets (e.g., multiple HARQ resource sets) configured, each one may be associated with a feedback timing value and feedback type. For example, two different K values, K=K1 and K=K2 are supported in the system, and, both positive acknowledgement and negative acknowledgement feedback types are supported in the system. Then, there may be 4 feedback resource sets configured, one for K=K1 and positive acknowledgement, one for K=K1 and negative acknowledgement, one for K=K2 and positive acknowledgement, one for K=K2 and negative acknowledgement.

Figure 8:
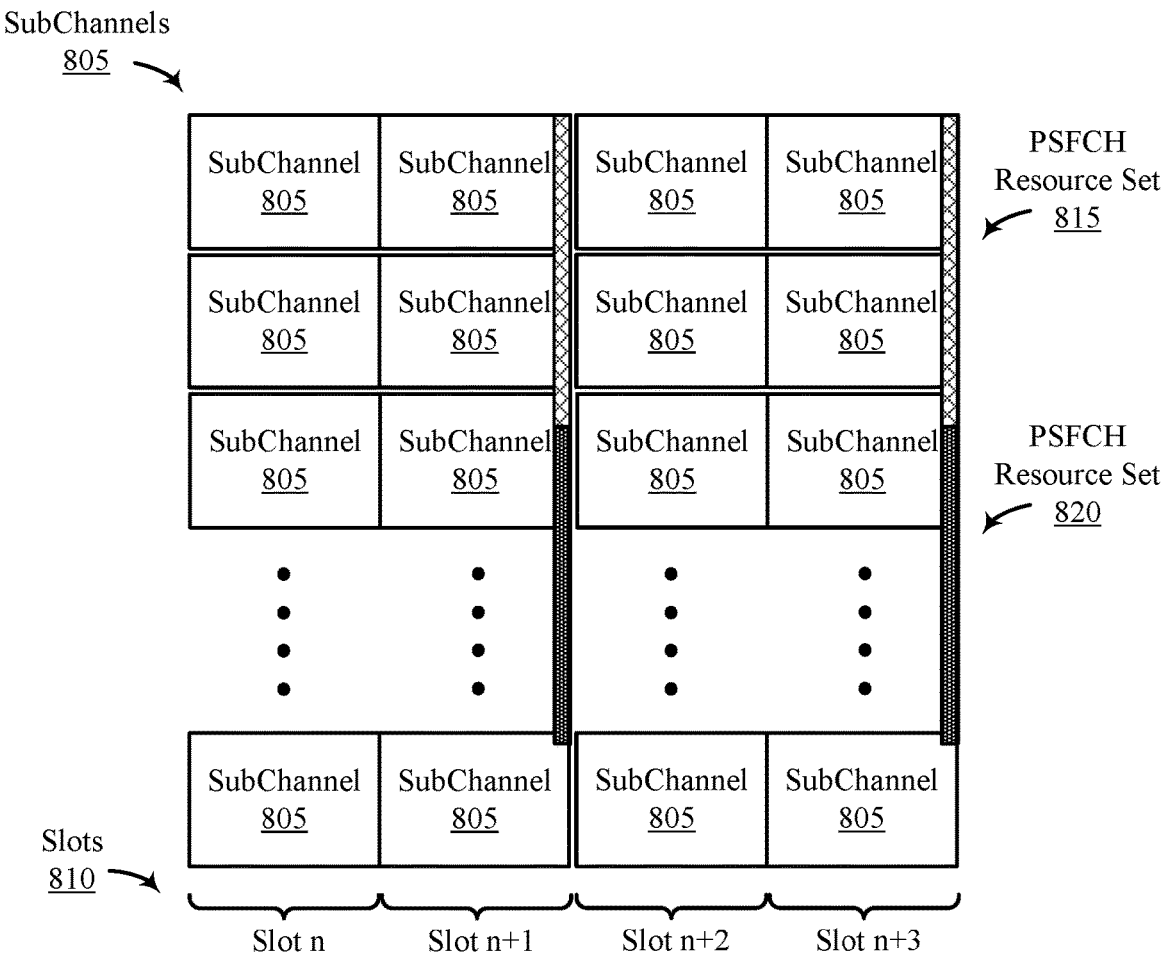
Figure 8:

FIG. 8 illustrates an example of a resource grid 800 that supports sidelink feedback transmission and feedback resource determination in accordance with aspects of the present disclosure. The resource grid 800 may implement aspects of the wireless communication systems 100 and 200, respectively, described with reference to FIGS. 1 and 2. In some examples, the resource grid 800 may correspond to a resource pool, which may be a function of a frequency domain and a time domain. For example, the resource grid 800 may span a number of subchannels 805 in a frequency domain and may span a number of slots 810 in a time domain. Each slot may include one or more symbols. In some examples, a subchannel 805 may span one symbol by one subcarrier. In some other examples, a subchannel 805 may span one symbol by multiple subcarriers.

In the example of FIG. 8, the resource grid 800 may include feedback resources for feedback, such as PSFCH resource sets. These resource sets may belong to a sidelink resource pool and may correspond to different feedback timing values. As illustrated, for example, a PSFCH resource set 815 may correspond to a first feedback timing value (e.g., K=K1), while a PSFCH resource set 820 may correspond to a second feedback timing value (e.g., K=K2). The PSFCH resources may cover a portion of frequency resources in a symbol (e.g., a PSFCH symbol) of a feedback slot (e.g., a PSFCH slot). That is, HARQ feedback candidates may span a portion of a sidelink resource pool. In the example of FIG. 8, the PSFCH resource set 815 and the PSFCH resource set 820 may be frequency division multiplexed (e.g., in a PSFCH. With reference to FIG. 2, in some examples, one or more of the UEs 115 may be configured with the resource grid 800, for example, via an RRC configuration or RRC signaling. As a result, the UEs 115 may communicate data transmission, control information, and feedback via sidelink communications, in accordance with the resource grid 800.

Figure 9:
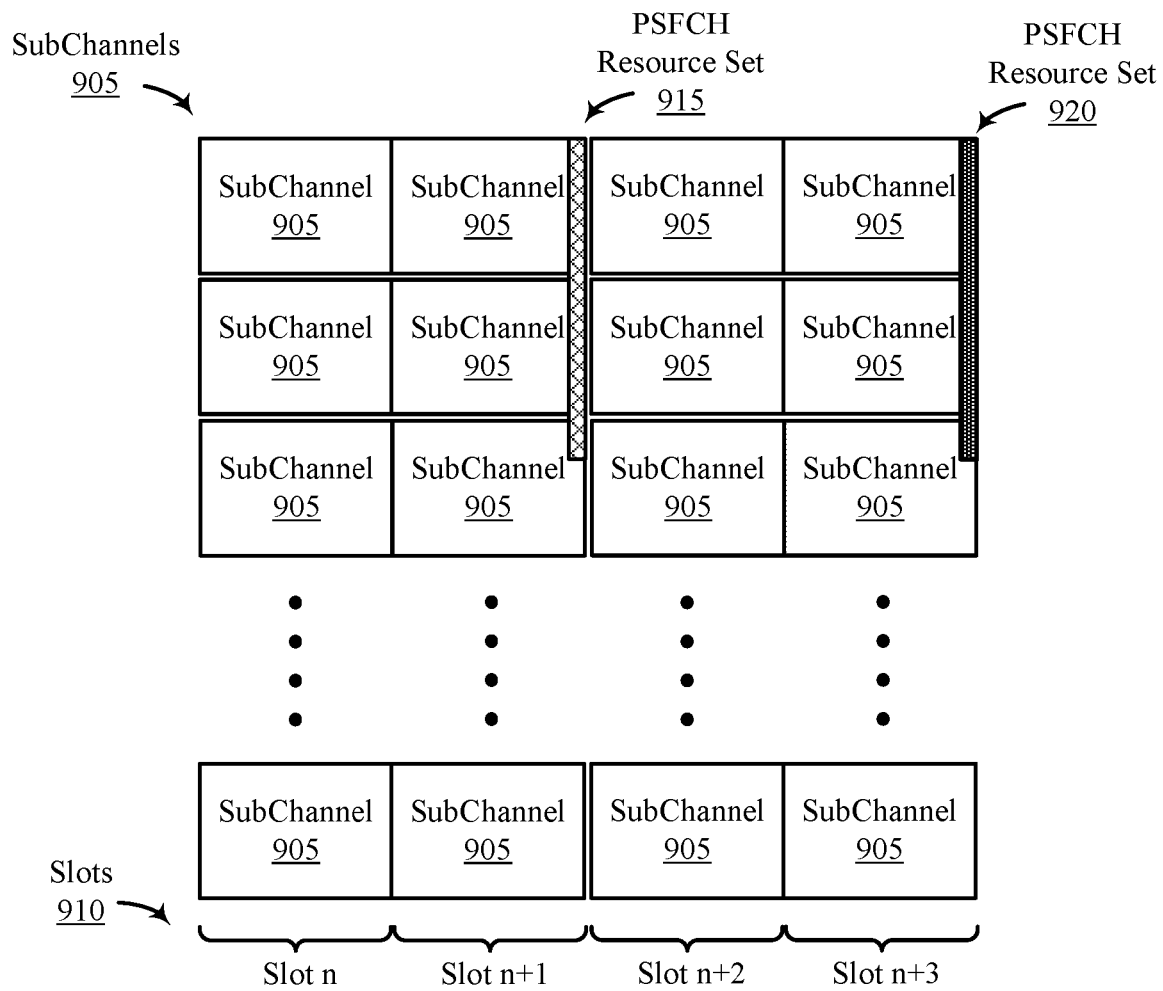
Figure 9:
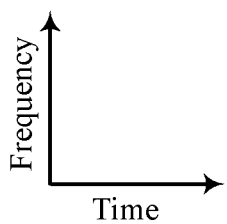

FIG. 9 illustrates an example of a resource grid 900 that supports sidelink feedback transmission and feedback resource determination in accordance with aspects of the present disclosure. The resource grid 900 may implement aspects of the wireless communication systems 100 and 200, respectively, described with reference to FIGS. 1 and 2. In some examples, the resource grid 900 may correspond to a resource pool, which may be a function of a frequency domain and a time domain. For example, the resource grid 900 may span a number of subchannels 905 in a frequency domain and may span a number of slots 910 in a time domain. Each slot may include one or more symbols. In some examples, a subchannel 905 may span one symbol by one subcarrier. In some other examples, a subchannel 905 may span one symbol by multiple subcarriers.

In the example of FIG. 9, the resource grid 900 may include feedback resources for feedback, such as PSFCH resource sets. These resource set may belong to a sidelink resource pool and may correspond to different feedback timing values. As illustrated, for example, a PSFCH resource set 915 may correspond to a first feedback timing value (e.g., K=K1), while a PSFCH resource set 920 may correspond to a second feedback timing value (e.g., K=K2). The PSFCH resources may cover a portion of frequency resources in a symbol (e.g., a PSFCH symbol) of a feedback slot (e.g., a PSFCH slot). That is, HARQ feedback candidates may span a portion of a sidelink resource pool. In the example of FIG. 9, the PSFCH resource set 915 and the PSFCH resource set 920 may be time division multiplexed (e.g., they are in different PSFCH. In the example of FIG. 9, the period of a feedback resource set with a certain K value may be larger than the period of feedback resources in the resource pool. With reference to FIG. 2, in some examples, one or more of the UEs 115 may be configured with the resource grid 900, for example, via an RRC configuration or RRC signaling. As a result, the UEs 115 may communicate data transmission, control information, and feedback via sidelink communications, in accordance with the resource grid 900.

Returning to FIG. 2, in some examples, there may not be such explicit configuration of multiple feedback resource sets, however, the determination of a feedback resource for a data transmission may take into account the feedback timing, such that for a different feedback timing value (e.g., K value), the determined feedback resource would also be different. For example, when the UEs 115 determine a feedback resource, the UEs 115 may consider the feedback timing, so for different feedback timing values (e.g., K values), the determined PSFCH resource would be different. For example, the UEs 115 may determine a resource location based on the following equation:

$$q = q_{shift,K} + m_L \times M_K + m_K \qquad (5)$$

where $q_{shift, K=K1}=0$ and $q_{shift, K=K2}=M_K \times M_L$. As such, when the K value is different, the determined feedback resource would be different. The wireless communications system 200 may therefore enable UEs 115 to transmit (or receive) sidelink feedback and determine feedback resource determination. The UEs 115 may, as a result, include features for improvements to power consumption, spectral efficiency, higher data rates and, in some examples, may promote enhanced efficiency for high reliability and low latency operations, among other benefits by supporting sidelink feedback transmissions and feedback resource determinations.

Figure 10:
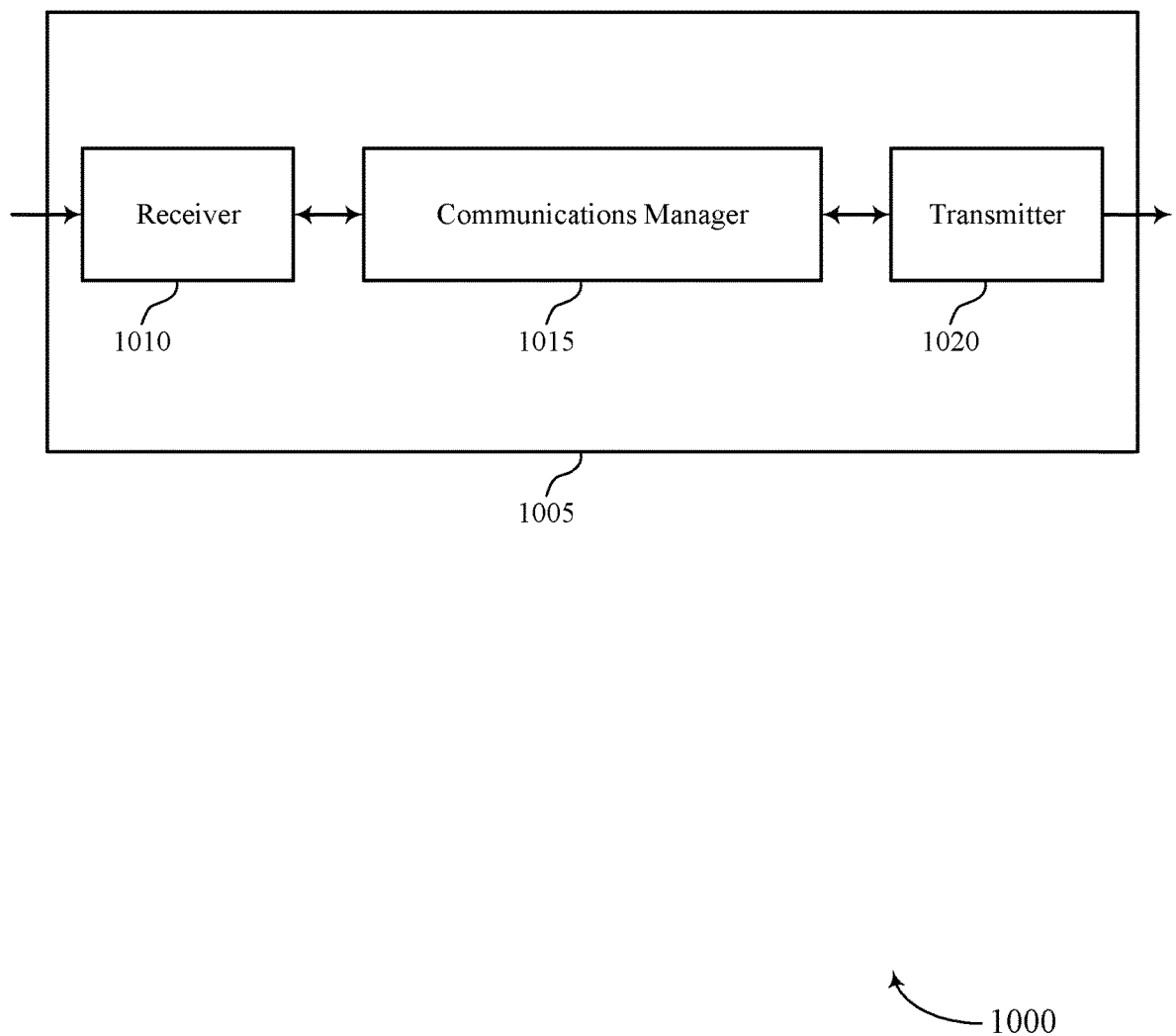
FIGS. 10 and 11 show block diagrams of devices that support sidelink feedback transmission and feedback resource determination in accordance with aspects of the present disclosure.

FIG. 10 shows a block diagram 1000 of a device 1005 that supports sidelink feedback transmission and feedback resource determination in accordance with aspects of the present disclosure. The device 1005 may be an example of aspects of a device as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink feedback transmission and feedback resource determination, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a data transmission, determine a slot to transmit a HARQ feedback based on the data transmission, determine one or more HARQ feedback resources or one or more HARQ feedback resource sets in the slot to transmit the HARQ feedback, where the one or more HARQ feedback resources or the one or more HARQ feedback resource sets in the slot includes a set of frequency resources associated with the slot, and transmit the HARQ feedback using the one or more HARQ feedback resources or the one or more HARQ feedback resource sets in the slot. The communications manager 1015 may also transmit a data transmission, determine a slot to receive a HARQ feedback based on the data transmission, determine one or more HARQ feedback resources or one or more HARQ feedback resource sets in the slot to receive the HARQ feedback, where the one or more HARQ feedback resources or the one or more HARQ feedback resource sets in the slot includes a set of frequency resources associated with the slot, and receive the HARQ feedback using the one or more HARQ feedback resources or the one or more HARQ feedback resource sets in the slot. The communications manager 1015 may be an example of aspects of the communications manager 1310 described herein.

The communications manager 1015 may be implemented as an integrated circuit or chipset for the device 1005, and the receiver 1010 and the transmitter 1020 may be implemented as analog components (for example, amplifiers, filters, antennas) coupled with the device 1005 modem to enable wireless transmission and reception The actions performed by the communications manager 1015 as described herein may be implemented to realize one or more potential advantages. At least one implementation may enable the communications manager 1015 to determine HARQ feedback resources or HARQ feedback resource sets and communicate a HARQ feedback using the HARQ feedback resource or HARQ feedback resource sets. Based on implementing the communicating, one or more processors of the device 1005 (for example, processor(s) controlling or incorporated with the communications manager 1015) may promote improvements to power consumption, spectral efficiency, higher data rates and, in some examples, may promote enhanced efficiency for high reliability and low latency operations, among other benefits by supporting sidelink feedback transmissions and feedback resource determinations.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
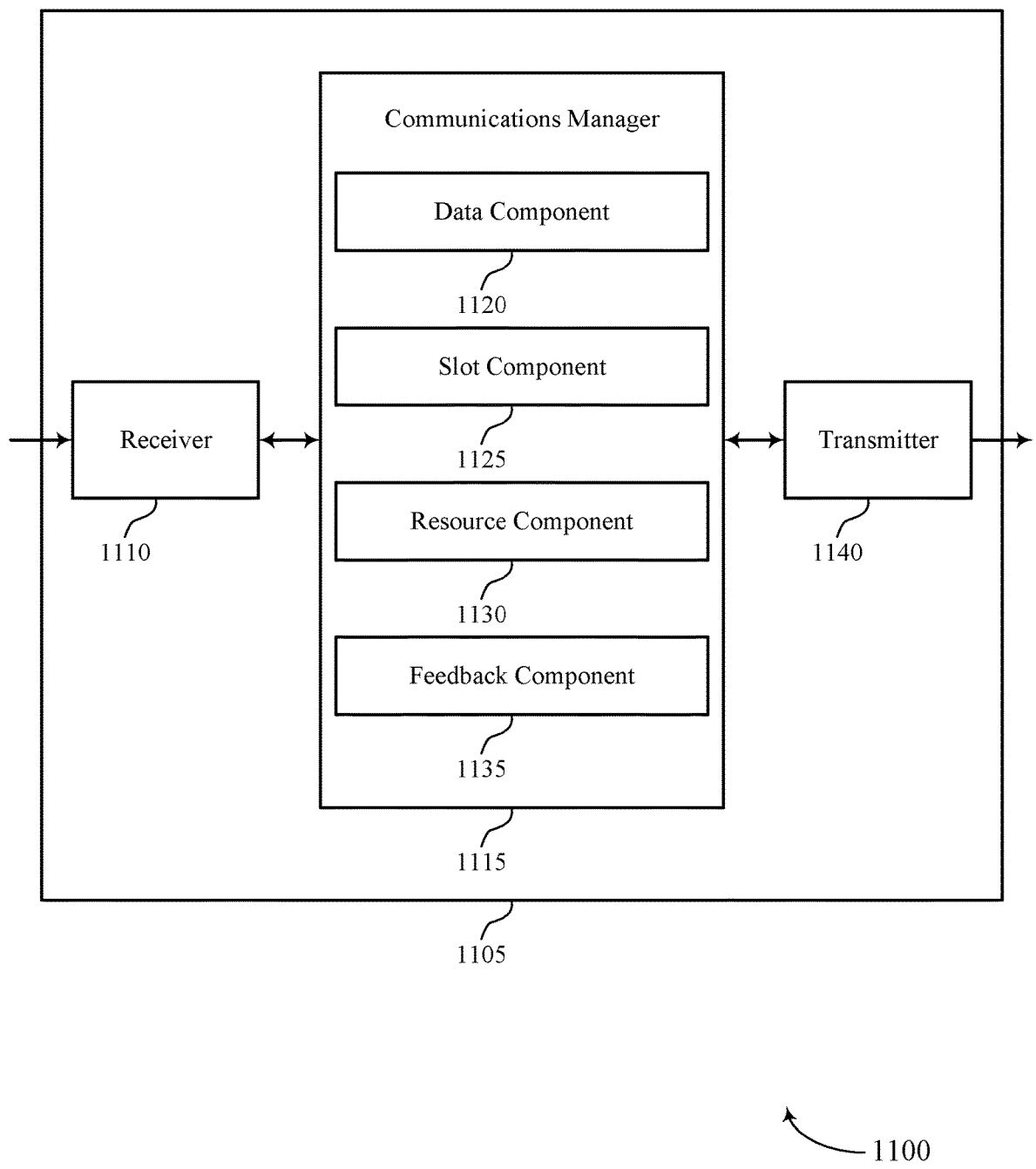

FIG. 11 shows a block diagram 1100 of a device 1105 that supports sidelink feedback transmission and feedback resource determination in accordance with aspects of the present disclosure. The device 1105 may be an example of aspects of a device 1005 or a UE 115 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink feedback transmission and feedback resource determination, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a data component 1120, a slot component 1125, a resource component 1130, and a feedback component 1135. The communications manager 1115 may be an example of aspects of the communications manager 1310 described herein.

The data component 1120 may receive a data transmission. The slot component 1125 may determine a slot to transmit a HARQ feedback based on the data transmission. The resource component 1130 may determine one or more HARQ feedback resources or one or more HARQ feedback resource sets in the slot to transmit the HARQ feedback, where the one or more HARQ feedback resources or the one or more HARQ feedback resource sets in the slot includes a set of frequency resources associated with the slot. The feedback component 1135 may transmit the HARQ feedback using the one or more HARQ feedback resources or the one or more HARQ feedback resource sets in the slot.

The data component 1120 may transmit a data transmission. The slot component 1125 may determine a slot to receive a HARQ feedback based on the data transmission. The resource component 1130 may determine one or more HARQ feedback resources or one or more HARQ feedback resource sets in the slot to receive the HARQ feedback, where the one or more HARQ feedback resources or the one or more HARQ feedback resource sets in the slot includes a set of frequency resources associated with the slot. The feedback component 1135 may receive the HARQ feedback using the one or more HARQ feedback resources or the one or more HARQ feedback resource sets in the slot.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
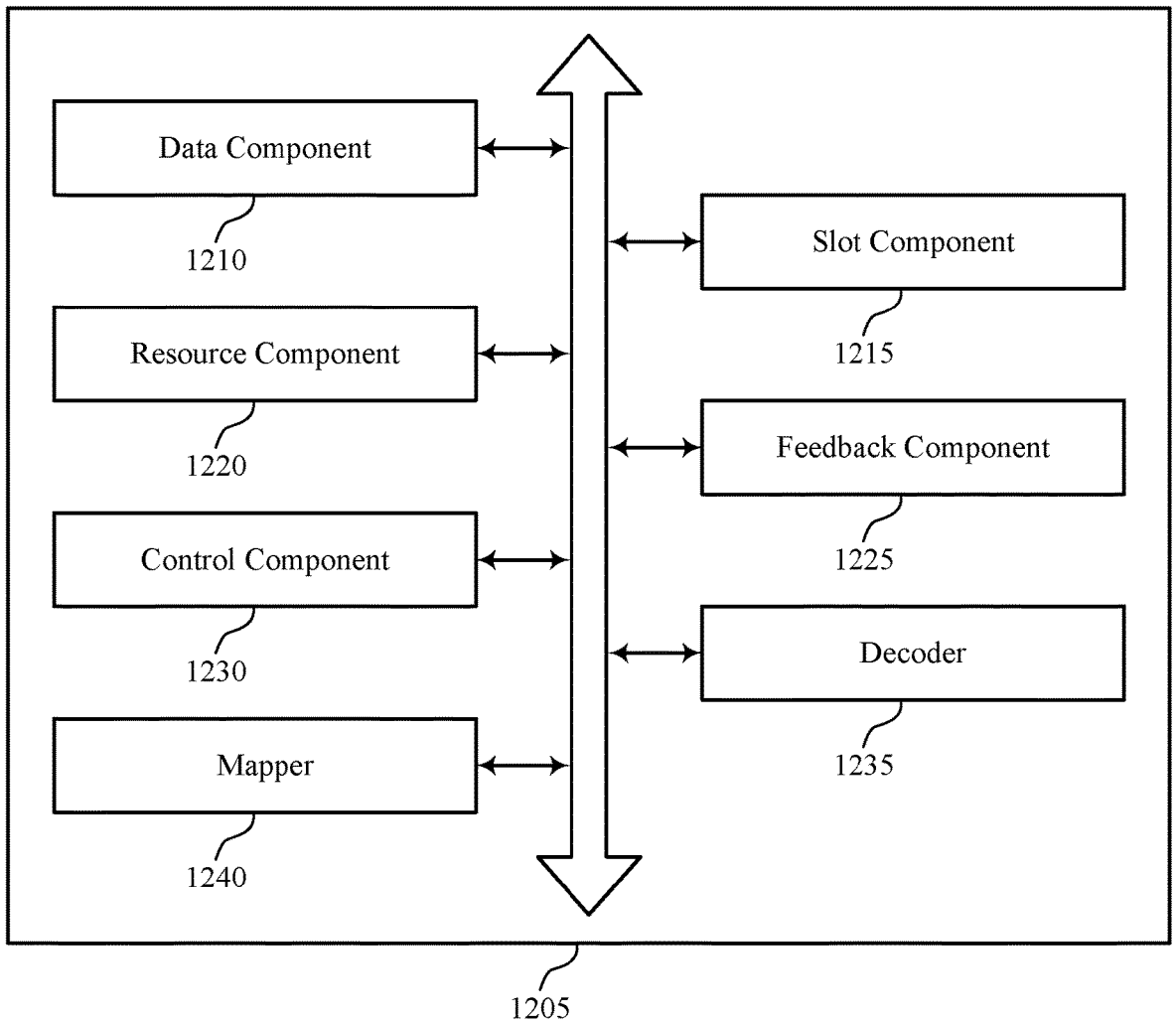
FIG. 12 shows a block diagram of a communications manager that supports sidelink feedback transmission and feedback resource determination in accordance with aspects of the present disclosure.

FIG. 12 shows a block diagram 1200 of a communications manager 1205 that supports sidelink feedback transmission and feedback resource determination in accordance with aspects of the present disclosure. The communications manager 1205 may be an example of aspects of a communications manager 1015, a communications manager 1115, or a communications manager 1310 described herein. The communications manager 1205 may include a data component 1210, a slot component 1215, a resource component 1220, a feedback component 1225, a control component 1230, a decoder 1235, and a mapper 1240. Each of these modules may communicate, directly or indirectly, with one another (e.g., via one or more buses).

The data component 1210 may receive a data transmission. In some examples, the data component 1210 may transmit a data transmission on a physical shared channel, where the physical shared channel includes a PSSCH. In some examples, receiving the data transmission on a physical shared channel, where the physical shared channel includes a PSSCH. In some cases, the data transmission includes a sidelink transmission on a PSSCH spanning one or more slots or one or more subchannels. The slot component 1215 may determine a slot to transmit a HARQ feedback based on the data transmission. In some examples, the slot component 1215 may determine a slot to receive a HARQ feedback based on the data transmission.

The resource component 1220 may determine one or more HARQ feedback resources or one or more HARQ feedback resource sets in the slot to transmit the HARQ feedback. In some examples, the resource component 1220 may determine one or more HARQ feedback resources or one or more HARQ feedback resource sets in the slot to receive the HARQ feedback. In some cases, the one or more HARQ feedback resources or the one or more HARQ feedback resource sets in the slot includes a set of frequency resources associated with the slot.

In some examples, the resource component 1220 may determine a HARQ feedback resource location of the one or more HARQ feedback resources or the one or more HARQ feedback resource sets in the slot based on one or more of a starting frequency resource of the data transmission, a starting frequency resource of a transmission of a control channel associated with the data transmission, an ending timing resource of a PSSCH, a subchannel index of the PSSCH, or a subchannel index of the PSCCH, where determining the one or more HARQ feedback resources or the one or more HARQ feedback resource sets in the slot to transmit the HARQ feedback is based on determining the HARQ feedback resource location. In some examples, the resource component 1220 may determine a resource location of the one or more HARQ feedback resources or the one or more HARQ feedback resource sets in the slot based on one or more of a first device identifier associated with the device or a second device identifier associated with a second device, where determining the one or more HARQ feedback resources or the one or more HARQ feedback resource sets in the slot to receive the HARQ feedback is based on determining the resource location.

In some examples, the resource component 1220 may determine one or more of the feedback mode, the feedback type, or the feedback timing value based on the data transmission. In some examples, the resource component 1220 may determine the one or more HARQ feedback resources or the one or more HARQ feedback resource sets in the slot to transmit the feedback transmission based on one or more of the feedback mode, the feedback type, or the feedback timing value.

In some examples, the resource component 1220 may determine a resource location (q) of the one or more HARQ resources or the one or more HARQ resource sets in the slot based at least in part on $m_L \times M_K + m_K$, where $m_L$ corresponds to an index of a last slot associated with a PSSCH, $M_K$ corresponds to a quantity of subchannels associated with the one or more HARQ feedback resources or the one or more HARQ feedback resource sets in the slot, and $m_K$ corresponds to a subchannel index associated with a frequency resource location of the PSSCH. In some examples, the resource component 1220 may determine a resource location (q) of the one or more HARQ resources or the one or more HARQ resource sets in the slot based at least in part on $m_K \times M_L + m_L$, where $m_K$ corresponds to a subchannel index associated with a frequency resource location of the PSSCH, $M_L$ corresponds to a quantity of slots associated with the one or more HARQ feedback resources or the one or more HARQ feedback resource sets in the slot, and $m_L$ corresponds to an index of a last slot associated with a PSSCH.

In some examples, the resource component 1220 may determine a HARQ feedback resource location of the one or more HARQ feedback resources or the one or more HARQ feedback resource sets in the slot based on one or more of a starting frequency resource of the data transmission, a starting frequency resource of a transmission of a control channel associated with the data transmission, an ending timing resource of a PSSCH, a subchannel index of the PSSCH, or a subchannel index of the PSCCH, where determining the one or more HARQ feedback resources or the one or more HARQ feedback resource sets in the slot to receive the HARQ feedback is based on determining the HARQ feedback resource location.

In some examples, the resource component 1220 may determine a resource location of the one or more HARQ feedback resources or the one or more HARQ feedback resource sets in the slot based on one or more of a first device identifier associated with the device or a second device identifier associated with a second device, where determining the one or more HARQ feedback resources or the one or more HARQ feedback resource sets in the slot to receive the HARQ feedback is based on determining the resource location. In some examples, the resource component 1220 may determine a resource from the one or more HARQ feedback resources in the slot based on one or more of a first device identifier associated with the device or a second device identifier associated with a second device, where transmitting the HARQ feedback using the one or more HARQ feedback resources in the slot comprises transmitting the HARQ feedback using the determined resource.

In some examples, the resource component 1220 may determine a number of resource blocks for the HARQ feedback based on one or more of an ending timing resource of a PSCCH, a subchannel index of a PSSCH, or a subchannel index of the PSCCH. In some cases, the resource component 1220 may determine a set of HARQ feedback resources corresponding to the data transmission and may determine a HARQ resource from the set of HARQ feedback resources based on one or more of a first device identifier associated with the device or a second device identifier associated with a second device.

In some examples, the resource component 1220 may determine one or more of the feedback mode, the feedback type, or the feedback timing value based on the data transmission. In some examples, the resource component 1220 may determine the one or more HARQ feedback resources or the one or more HARQ feedback resource sets in the slot to receive the feedback transmission based on one or more of the feedback mode, the feedback type, or the feedback timing value.

In some cases, the one or more HARQ feedback resources or the one or more HARQ feedback resource sets includes one or more orthogonal frequency-division multiplexing (OFDM) symbols in a time domain and one or more resource blocks in a frequency domain. In some cases, one or more of the first device identifier associated with the device or the second device identifier associated with the second device is a layer one identifier. In some cases, one or more of the first device identifier associated with the device includes a layer one identifier, a group identifier, or an upper layer identifier, and where determining the one or more HARQ feedback resources or the one or more HARQ feedback resource sets in the slot to transmit the HARQ feedback is based on the layer one identifier, the group identifier, or the upper layer identifier.

In some cases, one or more of the one or more HARQ feedback resources or the one or more HARQ feedback resource sets in the slot correspond to one or more of a feedback mode, a feedback type, or a feedback timing value. In some cases, the feedback mode includes transmitting exclusively a negative acknowledgment. In some cases, the feedback mode includes transmitting a positive acknowledgement or a negative acknowledgment.

In some cases, each HARQ feedback resource set of the one or more HARQ feedback resource sets in the slot corresponds to one or more of the feedback mode, the feedback type, or the feedback timing value. In some cases, one or more of the feedback mode or the feedback type corresponds to different sequences. In some cases, one or more of the feedback mode or the feedback type corresponds to a sequence with different cyclic shifts. In some cases, one or more of the feedback mode or the feedback type corresponds to a sequence with different cover codes. In some cases, the one or more HARQ feedback resources or the one or more HARQ feedback resource sets in the slot are frequency division multiplexed. In some cases, the one or more HARQ feedback resources or the one or more HARQ feedback resource sets in the slot are time division multiplexed. In some cases, the one or more HARQ feedback resources or the one or more HARQ feedback resource sets includes one or more orthogonal frequency-division multiplexing symbols in a time domain and one or more resource blocks in a frequency domain.

In some examples, where determining one HARQ feedback resource in the slot to receive or transmit the HARQ feedback, the resource component 1220 may determine a HARQ feedback resource set based at least in part on one or more of a HARQ feedback type, a HARQ feedback mode, a HARQ feedback timing, or a HARQ feedback resource configuration, and determine the HARQ feedback resource based at least in part on the HARQ feedback resource set.

The feedback component 1225 may transmit the HARQ feedback using the one or more resources or the one or more resource sets in the slot. In some examples, the feedback component 1225 may receive the HARQ feedback using the one or more HARQ feedback resources or the one or more HARQ feedback resource sets in the slot. In some cases, the HARQ feedback corresponds to a groupcast HARQ feedback. In some cases, transmitting the HARQ feedback using the one or more resources or the one or more resource sets in the slot may include transmitting the HARQ feedback using one or more cyclic shifts based on a feedback type of the one or more HARQ feedback resources, wherein the feedback type comprises an ACK type or a NACK type.

The control component 1230 may receive sidelink control information carrying the second device identifier associated with the second device, where determining the one or more HARQ feedback resources or the one or more HARQ feedback resource sets in the slot to transmit the HARQ feedback is based on the second device identifier associated with the second device.

In some examples, the control component 1230 may receive sidelink control information carrying the second device identifier associated with the second device, where determining the one or more HARQ feedback resources or the one or more HARQ feedback resource sets in the slot to receive the HARQ feedback is based on the second device identifier associated with the second device.

The decoder 1235 may decode one or more of a control portion or a data portion of the data transmission, where transmitting the HARQ feedback includes: transmitting, after decoding one or more of the control portion or the data portion of the data transmission, the HARQ feedback using the one or more HARQ feedback resources or the one or more HARQ feedback resource sets in the slot.

In some cases, the data transmission includes a sidelink transmission.

The mapper 1240 may map, based on one or more of the feedback mode, the feedback type, or the feedback timing value, a PSSCH associated with the data transmission to a HARQ feedback resource associated with one or more of the one or more HARQ feedback resources or the one or more HARQ feedback resource sets in the slot, where transmitting the HARQ feedback includes transmitting the HARQ feedback using the HARQ feedback resource. In some cases, the mapper 1240 may map, based on one or more of the feedback mode, the feedback type, or the feedback timing value, a PSSCH associated with the data transmission to a HARQ feedback resource associated with one or more of the one or more HARQ feedback resources or the one or more HARQ feedback resource sets in the slot, where transmitting the HARQ feedback includes receiving the HARQ feedback using the HARQ feedback resource.

Figure 13:
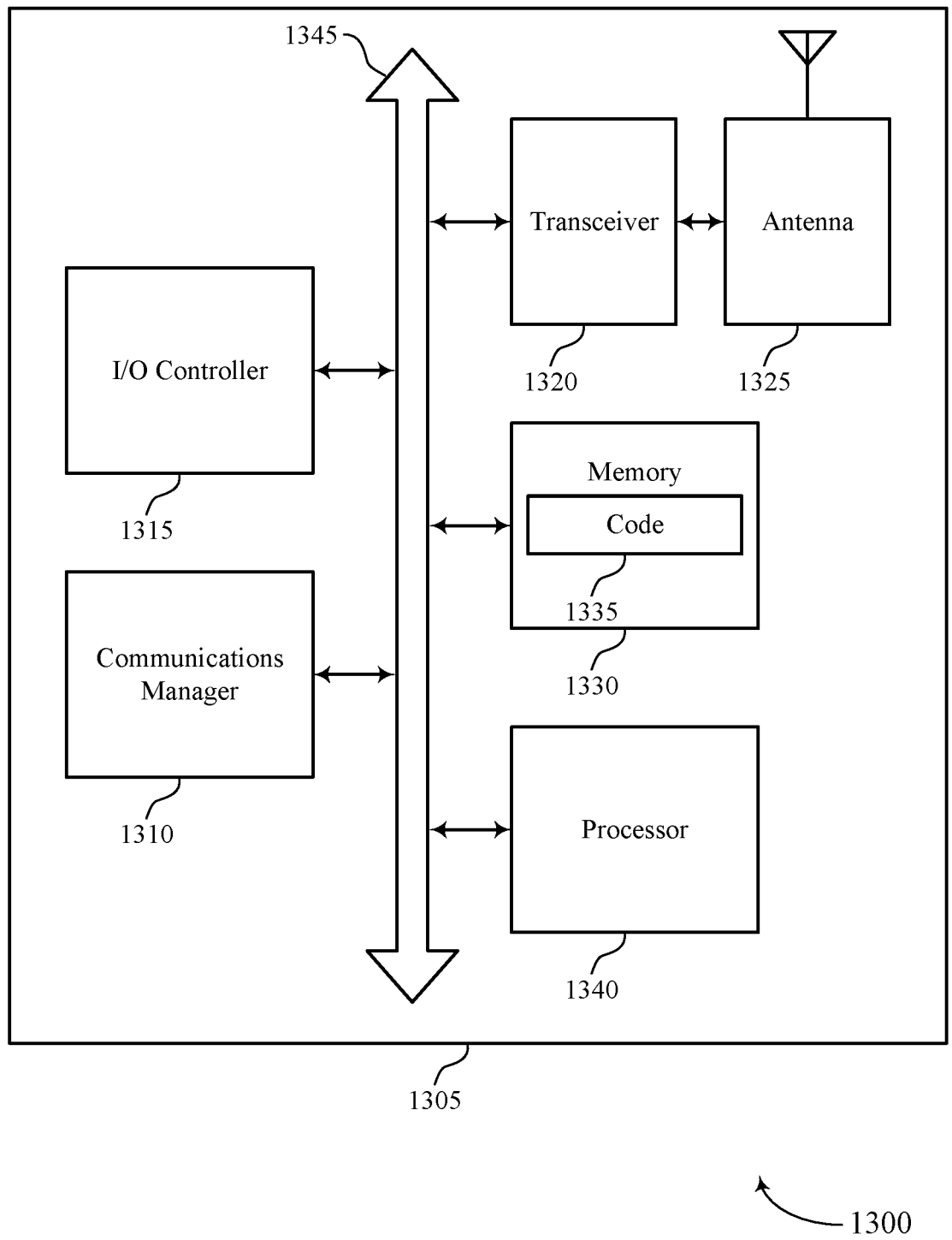
FIG. 13 shows a diagram of a system including a device that supports sidelink feedback transmission and feedback resource determination in accordance with aspects of the present disclosure.

FIG. 13 shows a diagram of a system 1300 including a device 1305 that supports sidelink feedback transmission and feedback resource determination in accordance with aspects of the present disclosure. The device 1305 may be an example of or include the components of device 1005, device 1105, or a device as described herein. The device 1305 may include components for bi-directional voice and data communications including components for transmitting and receiving communications, including a communications manager 1310, an I/O controller 1315, a transceiver 1320, an antenna 1325, memory 1330, a processor 1340, and a coding manager 1350. These components may be in electronic communication via one or more buses (e.g., bus 1345).

The communications manager 1310 may receive a data transmission, determine a slot to transmit a HARQ feedback based on the data transmission, determine one or more HARQ feedback resources or one or more HARQ feedback resource sets in the slot to transmit the HARQ feedback, where the one or more HARQ feedback resources or the one or more HARQ feedback resource sets in the slot includes a set of frequency resources associated with the slot, and transmit the HARQ feedback using the one or more HARQ feedback resources or the one or more HARQ feedback resource sets in the slot. The communications manager 1310 may also transmit a data transmission, determine a slot to receive a HARQ feedback based on the data transmission, determine one or more HARQ feedback resources or one or more HARQ feedback resource sets in the slot to receive the HARQ feedback, and receive the HARQ feedback using the one or more HARQ feedback resources or the one or more HARQ feedback resource sets in the slot.

At least one implementation may enable to communications manager 1310 to determine HARQ feedback resources or HARQ feedback resource sets and communicate a HARQ feedback using the HARQ feedback resource or HARQ feedback resource sets. Based on implementing the communicating, one or more processors of the device 1305 (for example, processor(s) controlling or incorporated with the communications manager 1315) may promote improvements to power consumption, spectral efficiency, higher data rates and, in some examples, may promote enhanced efficiency for high reliability and low latency operations, among other benefits by supporting sidelink feedback transmissions and feedback resource determinations.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS, ANDROID, MS-DOS, MS-WINDOWS, OS/2, UNIX, LINUX, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases the device 1305 may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting sidelink feedback transmission and feedback resource determination).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
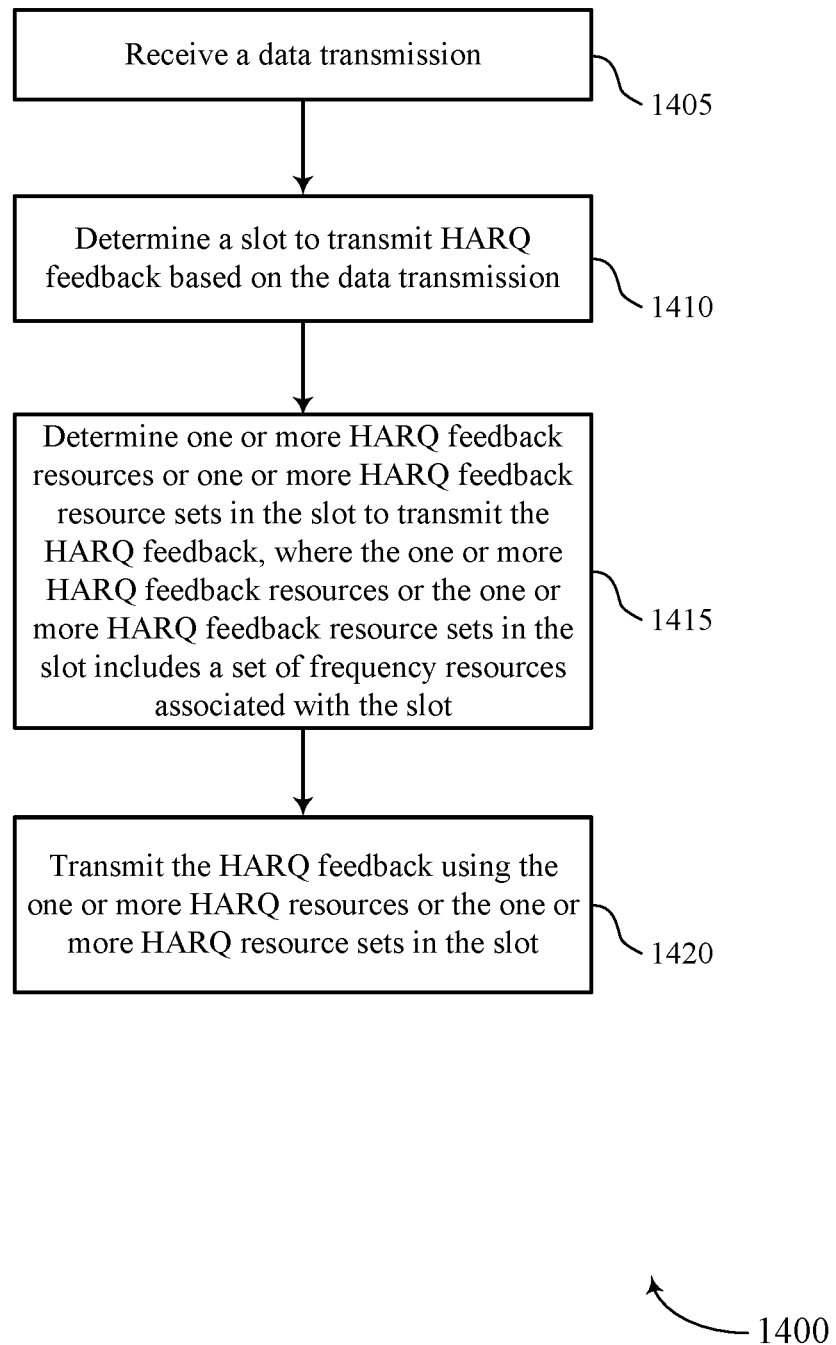
FIGS. 14 through 19 show flowcharts illustrating methods that support sidelink feedback transmission and feedback resource determination in accordance with aspects of the present disclosure.

FIG. 14 shows a flowchart illustrating a method 1400 that supports sidelink feedback transmission and feedback resource determination in accordance with aspects of the present disclosure. The operations of method 1400 may be implemented by a device or its components as described herein. For example, the operations of method 1400 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1405, the device may receive a data transmission. The operations of 1405 may be performed according to the methods described herein. In some examples, aspects of the operations of 1405 may be performed by a data component as described with reference to FIGS. 10 through 13.

At 1410, the device may determine a slot to transmit a HARQ feedback based on the data transmission. The operations of 1410 may be performed according to the methods described herein. In some examples, aspects of the operations of 1410 may be performed by a slot component as described with reference to FIGS. 10 through 13.

At 1415, the device may determine one or more HARQ feedback resources or one or more HARQ feedback resource sets in the slot to transmit the HARQ feedback, where the one or more HARQ feedback resources or the one or more HARQ feedback resource sets in the slot includes a set of frequency resources associated with the slot. The operations of 1415 may be performed according to the methods described herein. In some examples, aspects of the operations of 1415 may be performed by a resource component as described with reference to FIGS. 10 through 13.

At 1420, the device may transmit the HARQ feedback using the one or more HARQ feedback resources or the one or more HARQ feedback resource sets in the slot. The operations of 1420 may be performed according to the methods described herein. In some examples, aspects of the operations of 1420 may be performed by a feedback component as described with reference to FIGS. 10 through 13.

Figure 15:
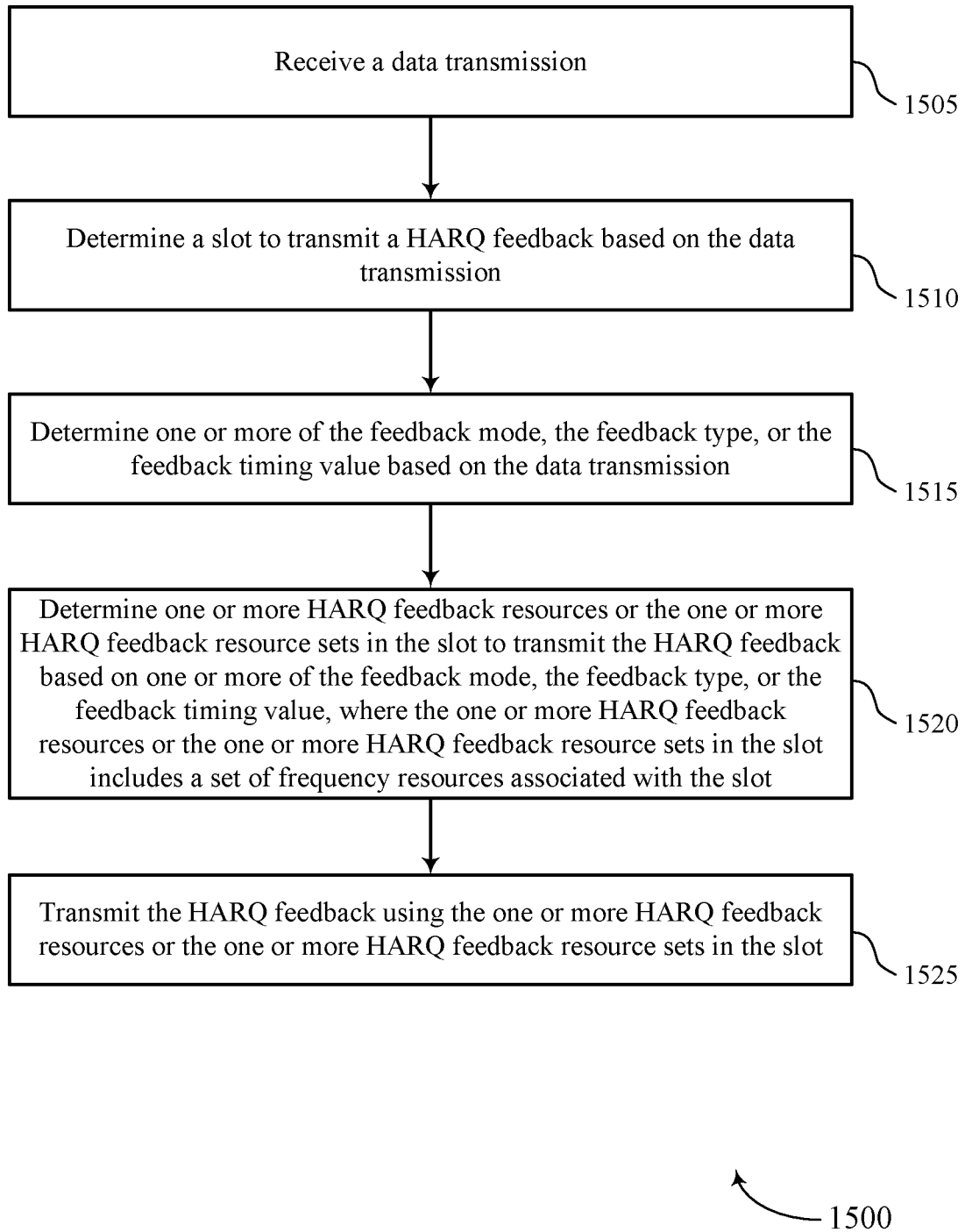

FIG. 15 shows a flowchart illustrating a method 1500 that supports sidelink feedback transmission and feedback resource determination in accordance with aspects of the present disclosure. The operations of method 1500 may be implemented by a device or its components as described herein. For example, the operations of method 1500 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1505, the device may receive a data transmission. The operations of 1505 may be performed according to the methods described herein. In some examples, aspects of the operations of 1505 may be performed by a data component as described with reference to FIGS. 10 through 13.

At 1510, the device may determine a slot to transmit a HARQ feedback based on the data transmission. The operations of 1510 may be performed according to the methods described herein. In some examples, aspects of the operations of 1510 may be performed by a slot component as described with reference to FIGS. 10 through 13.

At 1515, the device may determine one or more of the feedback mode, the feedback type, or the feedback timing value based on the data transmission. The operations of 1515 may be performed according to the methods described herein. In some examples, aspects of the operations of 1515 may be performed by a resource component as described with reference to FIGS. 10 through 13.

At 1520, the device may determine one or more HARQ feedback resources or the one or more HARQ feedback resource sets in the slot to transmit the feedback transmission based on one or more of the feedback mode, the feedback type, or the feedback timing value. In some examples, one or more of the one or more HARQ feedback resources or the one or more HARQ feedback resource sets in the slot correspond to one or more of a feedback mode, a feedback type, or a feedback timing value, where the one or more HARQ feedback resources or the one or more HARQ feedback resource sets in the slot includes a set of frequency resources associated with the slot. The operations of 1520 may be performed according to the methods described herein. In some examples, aspects of the operations of 1520 may be performed by a resource component as described with reference to FIGS. 10 through 13.

At 1525, the device may transmit the HARQ feedback using the one or more HARQ feedback resources or the one or more HARQ feedback resource sets in the slot. The operations of 1525 may be performed according to the methods described herein. In some examples, aspects of the operations of 1525 may be performed by a feedback component as described with reference to FIGS. 10 through 13.

Figure 16:
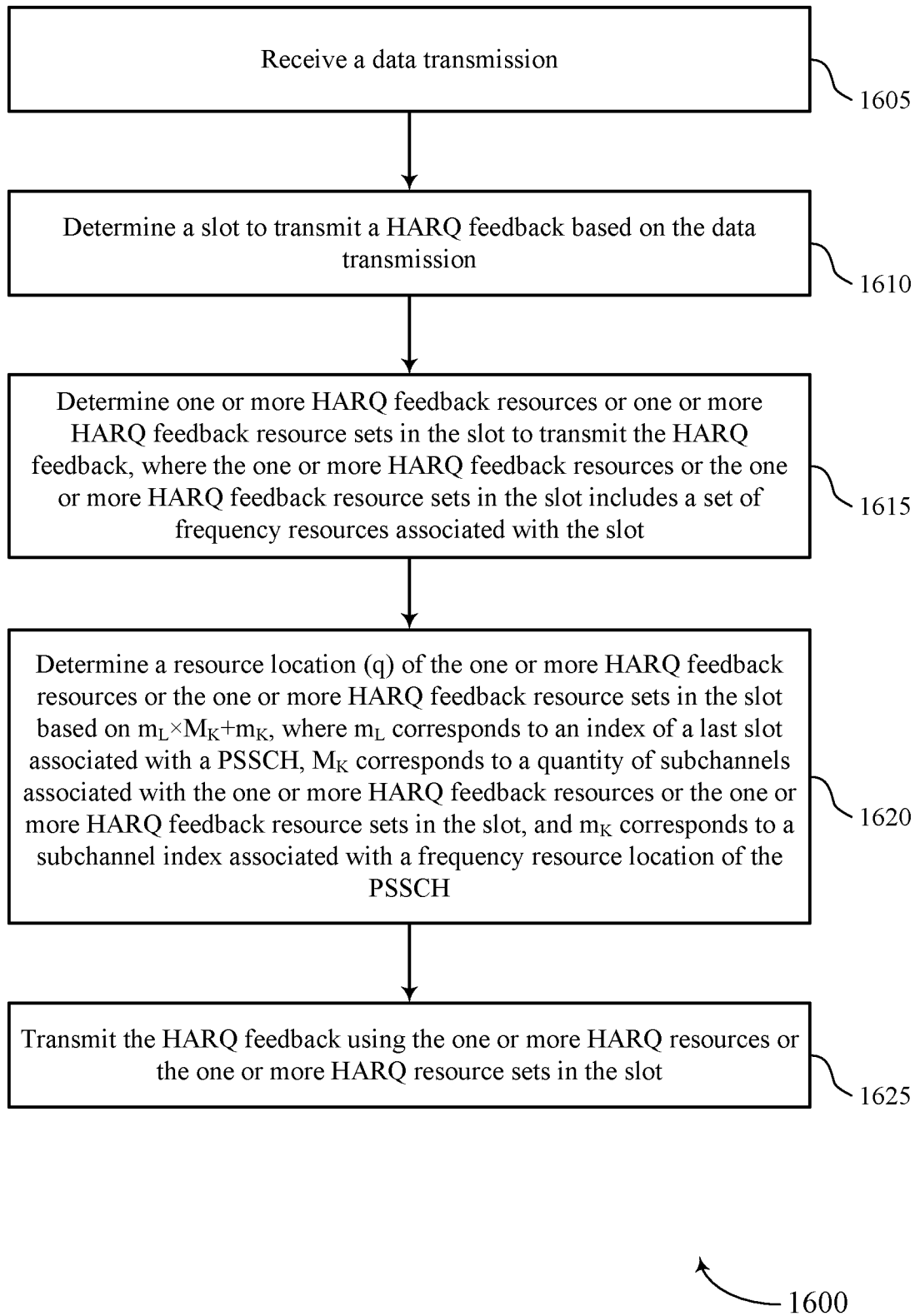

FIG. 16 shows a flowchart illustrating a method 1600 that supports sidelink feedback transmission and feedback resource determination in accordance with aspects of the present disclosure. The operations of method 1600 may be implemented by a device or its components as described herein. For example, the operations of method 1600 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1605, the device may receive a data transmission. The operations of 1605 may be performed according to the methods described herein. In some examples, aspects of the operations of 1605 may be performed by a data component as described with reference to FIGS. 10 through 13.

At 1610, the device may determine a slot to transmit a HARQ feedback based on the data transmission. The operations of 1610 may be performed according to the methods described herein. In some examples, aspects of the operations of 1610 may be performed by a slot component as described with reference to FIGS. 10 through 13.

At 1615, the device may determine one or more HARQ feedback resources or one or more HARQ feedback resource sets in the slot to transmit the HARQ feedback, where the one or more HARQ feedback resources or the one or more HARQ feedback resource sets in the slot includes a set of frequency resources associated with the slot. The operations of 1615 may be performed according to the methods described herein. In some examples, aspects of the operations of 1615 may be performed by a resource component as described with reference to FIGS. 10 through 13.

At 1620, the device may determine a resource location (q) of the one or more HARQ feedback resources or the one or more HARQ feedback resource sets in the slot based at least in part on $m_L \times M_K + m_K$, where $m_L$ corresponds to an index of a last slot associated with a PSSCH, $M_K$ corresponds to a quantity of subchannels associated with the one or more HARQ feedback resources or the one or more HARQ feedback resource sets in the slot, and $m_K$ corresponds to a subchannel index associated with a frequency resource location of the PSSCH. The operations of 1620 may be performed according to the methods described herein. In some examples, aspects of the operations of 1620 may be performed by a resource component as described with reference to FIGS. 10 through 13.

At 1625, the device may transmit the HARQ feedback using the one or more HARQ feedback resources or the one or more HARQ feedback resource sets in the slot. The operations of 1625 may be performed according to the methods described herein. In some examples, aspects of the operations of 1625 may be performed by a feedback component as described with reference to FIGS. 10 through 13.

Figure 17:
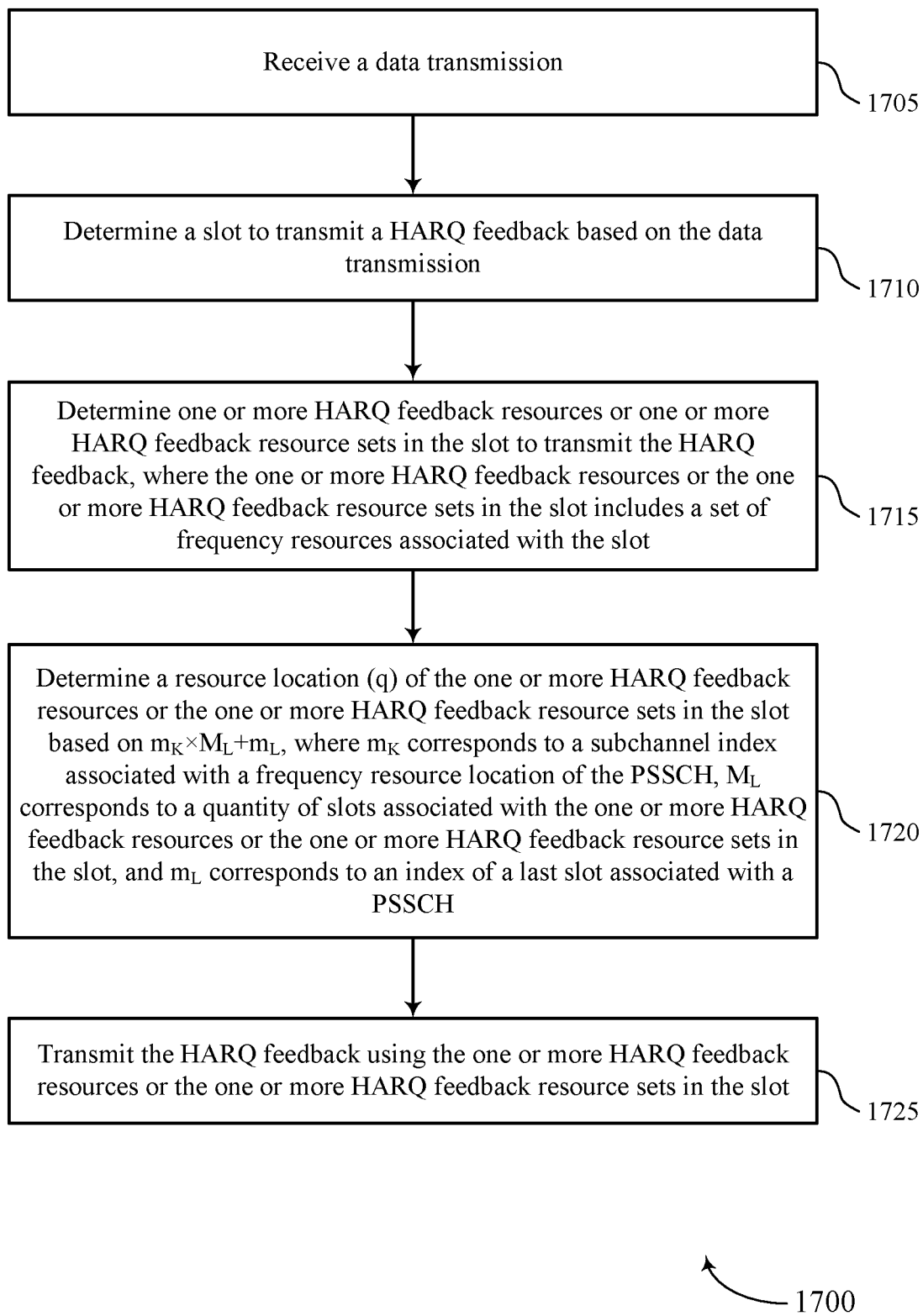

FIG. 17 shows a flowchart illustrating a method 1700 that supports sidelink feedback transmission and feedback resource determination in accordance with aspects of the present disclosure. The operations of method 1700 may be implemented by a device or its components as described herein. For example, the operations of method 1700 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1705, the device may receive a data transmission. The operations of 1705 may be performed according to the methods described herein. In some examples, aspects of the operations of 1705 may be performed by a data component as described with reference to FIGS. 10 through 13.

At 1710, the device may determine a slot to transmit a HARQ feedback based on the data transmission. The operations of 1710 may be performed according to the methods described herein. In some examples, aspects of the operations of 1710 may be performed by a slot component as described with reference to FIGS. 10 through 13.

At 1715, the device may determine one or more HARQ feedback resources or one or more HARQ feedback resource sets in the slot to transmit the HARQ feedback, where the one or more HARQ feedback resources or the one or more HARQ feedback resource sets in the slot includes a set of frequency resources associated with the slot. The operations of 1715 may be performed according to the methods described herein. In some examples, aspects of the operations of 1715 may be performed by a resource component as described with reference to FIGS. 10 through 13.

At 1720, the device may determine a resource location (q) of the one or more HARQ feedback resources or the one or more HARQ feedback resource sets in the slot based on $m_K \times M_L + m_L$, where $m_K$ corresponds to a subchannel index associated with a frequency resource location of the PSSCH, $M_L$ corresponds to a quantity of slots associated with the one or more HARQ feedback resources or the one or more HARQ feedback resource sets in the slot, and $m_L$ corresponds to an index of a last slot associated with a PSSCH. The operations of 1720 may be performed according to the methods described herein. In some examples, aspects of the operations of 1720 may be performed by a resource component as described with reference to FIGS. 10 through 13.

At 1725, the device may transmit the HARQ feedback using the one or more HARQ feedback resources or the one or more HARQ feedback resource sets in the slot. The operations of 1725 may be performed according to the methods described herein. In some examples, aspects of the operations of 1725 may be performed by a feedback component as described with reference to FIGS. 10 through 13.

Figure 18:
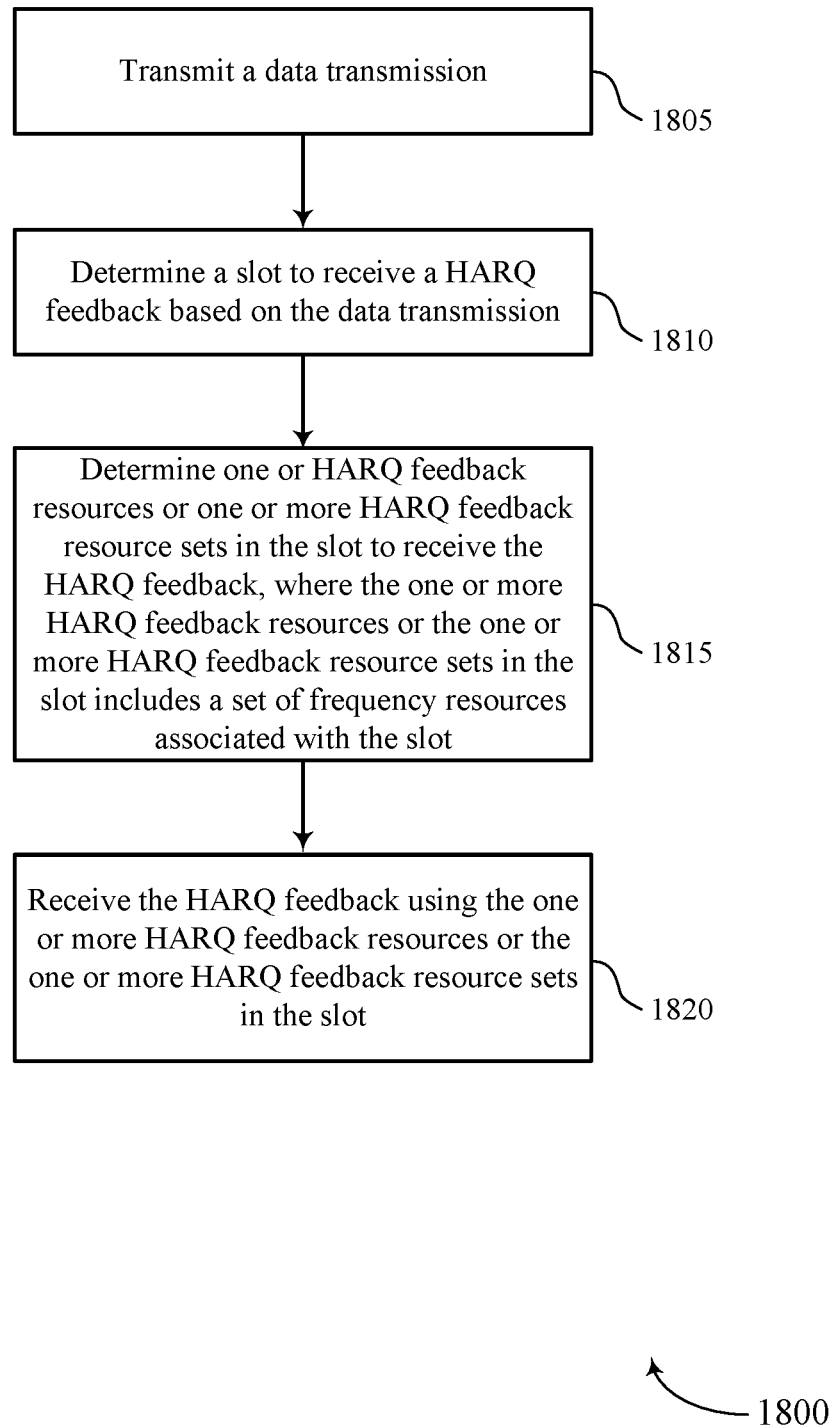

FIG. 18 shows a flowchart illustrating a method 1800 that supports sidelink feedback transmission and feedback resource determination in accordance with aspects of the present disclosure. The operations of method 1800 may be implemented by a device or its components as described herein. For example, the operations of method 1800 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1805, the device may transmit a data transmission. The operations of 1805 may be performed according to the methods described herein. In some examples, aspects of the operations of 1805 may be performed by a data component as described with reference to FIGS. 10 through 13.

At 1810, the device may determine a slot to receive a HARQ feedback based on the data transmission. The operations of 1810 may be performed according to the methods described herein. In some examples, aspects of the operations of 1810 may be performed by a slot component as described with reference to FIGS. 10 through 13.

At 1815, the device may determine one or more HARQ feedback resources or one or more HARQ feedback resource sets in the slot to receive the HARQ feedback, where the one or more HARQ feedback resources or the one or more HARQ feedback resource sets in the slot includes a set of frequency resources associated with the slot. The operations of 1815 may be performed according to the methods described herein. In some examples, aspects of the operations of 1815 may be performed by a resource component as described with reference to FIGS. 10 through 13.

At 1820, the device may receive the HARQ feedback using the one or more HARQ feedback resources or the one or more HARQ feedback resource sets in the slot. The operations of 1820 may be performed according to the methods described herein. In some examples, aspects of the operations of 1820 may be performed by a feedback component as described with reference to FIGS. 10 through 13.

Figure 19:
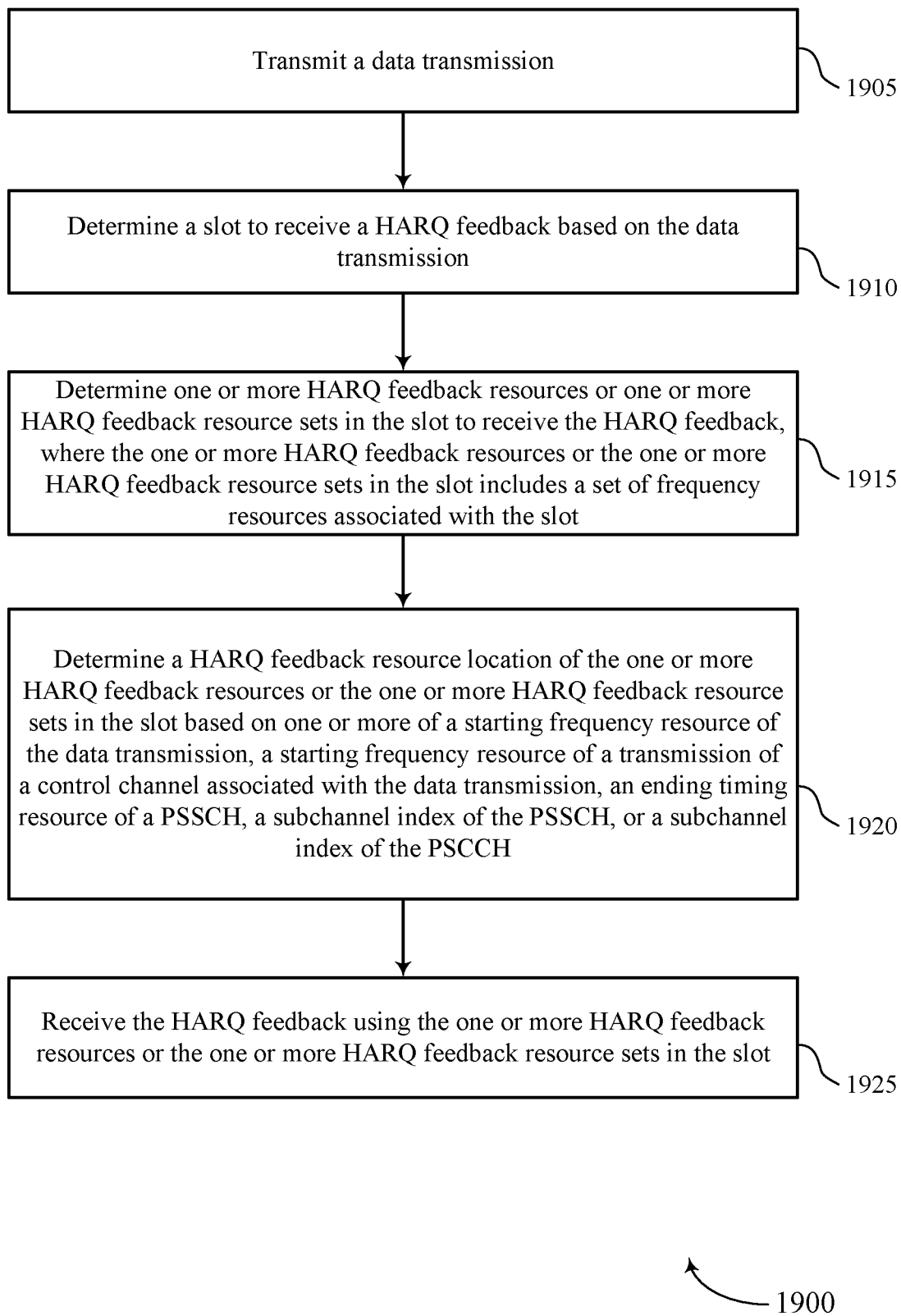

FIG. 19 shows a flowchart illustrating a method 1900 that supports sidelink feedback transmission and feedback resource determination in accordance with aspects of the present disclosure. The operations of method 1900 may be implemented by a device or its components as described herein. For example, the operations of method 1900 may be performed by a communications manager as described with reference to FIGS. 10 through 13. In some examples, a device may execute a set of instructions to control the functional elements of the device to perform the functions described below. Additionally or alternatively, a device may perform aspects of the functions described below using special-purpose hardware.

At 1905, the device may transmit a data transmission. The operations of 1905 may be performed according to the methods described herein. In some examples, aspects of the operations of 1905 may be performed by a data component as described with reference to FIGS. 10 through 13.

At 1910, the device may determine a slot to receive a HARQ feedback based on the data transmission. The operations of 1910 may be performed according to the methods described herein. In some examples, aspects of the operations of 1910 may be performed by a slot component as described with reference to FIGS. 10 through 13.

At 1915, the device may determine one or more HARQ feedback resources or one or more HARQ feedback resource sets in the slot to receive the HARQ feedback, where the one or more HARQ feedback resources or the one or more HARQ feedback resource sets in the slot includes a set of frequency resources associated with the slot. The operations of 1915 may be performed according to the methods described herein. In some examples, aspects of the operations of 1915 may be performed by a resource component as described with reference to FIGS. 10 through 13.

At 1920, the device may determine a HARQ feedback resource location of the one or more HARQ feedback resources or the one or more HARQ feedback resource sets in the slot based on one or more of a starting frequency resource of the data transmission, a starting frequency resource of a transmission of a control channel associated with the data transmission, an ending timing resource of a PSSCH, a subchannel index of the PSSCH, or a subchannel index of the PSCCH. The operations of 1920 may be performed according to the methods described herein. In some examples, aspects of the operations of 1920 may be performed by a resource component as described with reference to FIGS. 10 through 13.

At 1925, the device may receive the HARQ feedback using the one or more HARQ feedback resources or the one or more HARQ feedback resource sets in the slot. The operations of 1925 may be performed according to the methods described herein. In some examples, aspects of the operations of 1925 may be performed by a feedback component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein.

Example 1 is a method of wireless communication at a device that includes receiving a data transmission, determining a slot to transmit a HARQ feedback based on the data transmission, determining one or more HARQ feedback resources or one or more HARQ feedback resource sets in the slot to transmit the HARQ feedback, where the one or more HARQ feedback resources or the one or more HARQ feedback resource sets in the slot includes a set of frequency resources associated with the slot, and transmitting the HARQ feedback using the one or more HARQ resources or the one or more HARQ resource sets in the slot.

In Example 2, the method of example 1 may include where the one or more HARQ feedback resources or the one or more HARQ feedback resource sets includes one or more orthogonal frequency-division multiplexing symbols in a time domain and one or more resource blocks in a frequency domain.

In Example 3, the method of examples 1-2 may include receiving the data transmission may include operations, features, means, or instructions for receiving the data transmission on a physical shared channel, where the physical shared channel includes a PSSCH.

In Example 4, the method of examples 1-3 may include determining a HARQ feedback resource location of the one or more HARQ feedback resources or the one or more HARQ feedback resource sets in the slot based on one or more of a starting frequency resource of the data transmission, a starting frequency resource of a transmission of a control channel associated with the data transmission, an ending timing resource of a PSSCH, a subchannel index of the PSSCH, or a subchannel index of the PSCCH, where determining the one or more HARQ feedback resources or the one or more HARQ feedback resource sets in the slot to transmit the HARQ feedback may be based on determining the HARQ feedback resource location.

In Example 5, the method of examples 1-4 may include determining a resource location of the one or more HARQ feedback resources or the one or more HARQ feedback resource sets in the slot based on one or more of a first device identifier associated with the device or a second device identifier associated with a second device, where determining the one or more HARQ feedback resources or the one or more HARQ feedback resource sets in the slot to transmit the HARQ feedback may be based on determining the resource location.

In Example 6, the method of examples 1-5 may include where one or more of the first device identifier associated with the device or the second device identifier associated with the second device may be a layer one identifier.

In Example 7, the method of examples 1-6 may include receiving sidelink control information carrying the second device identifier associated with the second device, where determining the one or more HARQ feedback resources or the one or more HARQ feedback resource sets in the slot to transmit the HARQ feedback may be based on the second device identifier associated with the second device.

In Example 8, the method of examples 1-7 may include where one or more of the first device identifier associated with the device includes a layer one identifier, a group identifier, or an upper layer identifier, and where determining the one or more HARQ feedback resources or the one or more HARQ feedback resource sets in the slot to transmit the HARQ feedback may be based on the layer one identifier, the group identifier, or the upper layer identifier.

In Example 9, the method of examples 1-8 may include decoding one or more of a control portion or a data portion of the data transmission, where transmitting the HARQ feedback includes: transmitting, after decoding one or more of the control portion or the data portion of the data transmission, the HARQ feedback using the one or more HARQ feedback resources or the one or more HARQ feedback resource sets in the slot.

In Example 10, the method of examples 1-9 may include where determining the one or more HARQ feedback resources in the slot to transmit the HARQ feedback includes determining a number of resource blocks for the HARQ feedback based on one or more of an ending timing resource of a PSCCH, a subchannel index of a PSSCH, or a subchannel index of the PSCCH.

In Example 11, the method of examples 1-10 may include where receiving the data transmission includes receiving the data transmission on a physical shared channel, where the physical shared channel includes the PSSCH, where determining a number of resource blocks for the HARQ feedback includes determining a set of HARQ feedback resources corresponding to the data transmission.

In Example 12, the method of examples 1-11 may include determining a HARQ feedback resource from the set of HARQ feedback resources based on one or more of a first device identifier associated with the device or a second device identifier associated with a second device, where transmitting the HARQ feedback using the one or more HARQ feedback resources includes transmitting the HARQ feedback using the determined feedback resource.

In example 13, the method of examples 1-12 may include where transmitting the HARQ feedback using the one or more HARQ feedback resources in the slot includes transmitting the HARQ feedback using one or more cyclic shifts based on a feedback type of the one or more HARQ feedback resources, where the feedback type includes an ACK type or a NACK type.

In Example 14, the method of examples 1-13 may include where the data transmission includes a sidelink transmission.

In Example 15, the method of examples 1-14 may include where one or more of the one or more HARQ feedback resources or the one or more HARQ feedback resource sets in the slot correspond to one or more of a feedback mode, a feedback type, or a feedback timing value.

In Example 16, the method of examples 1-15 may include where the feedback mode includes transmitting exclusively a negative acknowledgment.

In Example 17, the method of examples 1-16 may include where the feedback mode includes transmitting a positive acknowledgement or a negative acknowledgment.

In Example 18, the method of examples 1-17 may include where each HARQ feedback resource set of the one or more HARQ feedback resource sets in the slot corresponds to one or more of the feedback mode, the feedback type, or the feedback timing value.

In Example 19, the method of examples 1-18 may include determining one or more of the feedback mode, the feedback type, or the feedback timing value based on the data transmission, and determining the one or more HARQ feedback resources or the one or more HARQ feedback resource sets in the slot to transmit the feedback transmission based on one or more of the feedback mode, the feedback type, or the feedback timing value.

In Example 20, the method of examples 1-19 may include mapping, based on one or more of the feedback mode, the feedback type, or the feedback timing value, a PSSCH associated with the data transmission to a HARQ feedback resource associated with one or more of the one or more HARQ feedback resources or the one or more HARQ feedback resource sets in the slot, where transmitting the HARQ feedback includes: transmitting the HARQ feedback using the HARQ feedback resource.

In Example 21, the method of examples 1-20 may include where one or more of the feedback mode or the feedback type corresponds to different sequences.

In Example 22, the method of examples 1-21 may include where one or more of the feedback mode or the feedback type corresponds to a sequence with different cyclic shifts.

In Example 23, the method of examples 1-22 may include determining the different cyclic shifts based at least in part on a first device identifier associated with the device or a second device identifier associated with a second device.

In Example 24, the method of examples 1-23 may include where one or more of the feedback mode or the feedback type corresponds to a sequence with different cover codes.

In Example 25, the method of examples 1-24 may include where the data transmission includes a sidelink transmission on a PSSCH spanning one or more slots or one or more subchannels.

In Example 26, the method of examples 1-25 may include determining a resource location (q) of the one or more HARQ feedback resources or the one or more HARQ feedback resource sets in the slot based at least in part on $m_L \times M_K + m_K$, where $m_L$ corresponds to an index of a last slot associated with a PSSCH, $M_K$ corresponds to a quantity of subchannels associated with the one or more HARQ feedback resources or the one or more HARQ feedback resource sets in the slot, and $m_K$ corresponds to a subchannel index associated with a frequency resource location of the PSSCH.

In Example 27, the method of examples 1-26 may include determining a resource location (q) of the one or more HARQ feedback resources or the one or more HARQ feedback resource sets in the slot based at least in part on $m_K \times M_L + m_L$, where $m_K$ corresponds to a subchannel index associated with a frequency resource location of the PSSCH, $M_L$ corresponds to a quantity of slots associated with the one or more HARQ feedback resources or the one or HARQ feedback resource sets in the slot, and $m_L$ corresponds to an index of a last slot associated with a PSSCH.

In Example 28, the method of examples 1-27 may include where the one or more HARQ feedback resources or the one or more HARQ feedback resource sets in the slot may be frequency division multiplexed.

In Example 29, the method of examples 1-28 may include where the one or more HARQ feedback resources or the one or more HARQ feedback resource sets in the slot may be time division multiplexed.

In Example 30, the method of examples 1-29 may include determining a HARQ feedback resource set based at least in part on one or more of a HARQ feedback type, a HARQ feedback mode, a HARQ feedback timing, or a HARQ feedback resource configuration, and determining the HARQ feedback resource based at least in part on the HARQ feedback resource set.

In Example 31, is a system including one or more processors and memory in electronic communication with the one or more processors storing instructions executable by the one or more processors to cause the system or apparatus to implement a method as in any of examples 1-30.

In Example 32, is an apparatus including means for implementing a method or realizing an apparatus as in any of examples 1-30.

In Example 33, is a non-transitory computer-readable medium storing instructions executable by one or more processors to cause the one or more processors to implement a method as in any of examples 1-30.

Example 34 is a method of wireless communication at a device that includes transmitting a data transmission, determining a slot to receive a HARQ feedback based on the data transmission, determining one or more HARQ feedback resources or one or more HARQ feedback resource sets in the slot to receive the HARQ feedback, where the one or more HARQ feedback resources or the one or more HARQ feedback resource sets in the slot includes a set of frequency resources associated with the slot, and receiving the HARQ feedback using the one or more HARQ feedback resources or the one or more HARQ feedback resource sets in the slot.

In Example 35, the method of example 34 may include where the one or more HARQ feedback resources or the one or more HARQ feedback resource sets includes one or more orthogonal frequency-division multiplexing symbols in a time domain and one or more resource blocks in a frequency domain.

In Example 36, the method of examples 34-35 may include transmitting the data transmission may include operations, features, means, or instructions for transmitting the data transmission on a physical shared channel, where the physical shared channel includes a PSSCH.

In Example 37, the method of examples 34-36 may include determining a HARQ feedback resource location of the one or more HARQ feedback resources or the one or more HARQ feedback resource sets in the slot based on one or more of a starting frequency resource of the data transmission, a starting frequency resource of a transmission of a control channel associated with the data transmission, an ending timing resource of a PSSCH, a subchannel index of the PSSCH, or a subchannel index of the PSCCH, where determining the one or more HARQ feedback resources or the one or more HARQ feedback resource sets in the slot to receive the HARQ feedback may be based on determining the HARQ feedback resource location.

In Example 38, the method of examples 34-37 may include determining a resource location of the one or more HARQ feedback resources or the one or more HARQ feedback resource sets in the slot based on one or more of a first device identifier associated with the device or a second device identifier associated with a second device, where determining the one or more HARQ feedback resources or the one or more HARQ feedback resource sets in the slot to receive the HARQ feedback may be based on determining the resource location.

In Example 39, the method of examples 34-38 may include where one or more of the first device identifier associated with the device or the second device identifier associated with the second device may be a layer one identifier.

In Example 40, the method of examples 34-39 may include receiving sidelink control information carrying the second device identifier associated with the second device, where determining the one or more HARQ feedback resources or the one or more HARQ feedback resource sets in the slot to receive the HARQ feedback may be based on the second device identifier associated with the second device.

In Example 41 the method of examples 34-40 may include where one or more of the first device identifier associated with the device includes a layer one identifier, a group identifier, or an upper layer identifier, and where determining the one or more HARQ feedback resources or the one or more HARQ feedback resource sets in the slot to receive the HARQ feedback may be based on the layer one identifier, the group identifier, or the upper layer identifier.

In Example 42, the method of examples 34-41 may include where determining the one or more HARQ feedback resources in the slot to transmit the HARQ feedback includes determining a number of resource blocks for the HARQ feedback based on one or more of an ending timing resource of a PSCCH, a subchannel index of a PSSCH, or a subchannel index of the PSCCH.

In Example 43, the method of examples 34-42 may include where transmitting the data transmission includes transmitting the data transmission on a physical shared channel, where the physical shared channel includes the PSSCH, where determining a number of resource blocks for the HARQ feedback includes determining a set of HARQ feedback resources corresponding to the data transmission.

In Example 44, the method of examples 34-43 may include determining a HARQ feedback resource from the set of HARQ feedback resources based on one or more of a first device identifier associated with the device or a second device identifier associated with a second device, where receiving the HARQ feedback using the one or more HARQ feedback resources includes receiving the HARQ feedback using the determined feedback resource.

In example 45, the method of examples 34-44 may include where receiving the HARQ feedback using the one or more HARQ feedback resources in the slot includes receiving the HARQ feedback using one or more cyclic shifts based on a feedback type of the one or more HARQ feedback resources, where the feedback type includes an ACK type or a NACK type.

In Example 46, the method of examples 34-45 may include where one or more of the one or more HARQ feedback resources or the one or more HARQ feedback resource sets in the slot correspond to one or more of a feedback mode, a feedback type, or a feedback timing value.

In Example 47, the method of examples 34-46 may include where the feedback mode includes transmitting exclusively a negative acknowledgment.

In Example 48, the method of examples 34-47 may include where the feedback mode includes transmitting a positive acknowledgement or a negative acknowledgment.

In Example 49, the method of examples 34-48 may include where each resource set of the one or more resource sets in the slot corresponds to one or more of the feedback mode, the feedback type, or the feedback timing value.

In Example 50, the method of examples 34-49 may include determining one or more of the feedback mode, the feedback type, or the feedback timing value based on the data transmission, and determining the one or more HARQ feedback resources or the one or more HARQ feedback resource sets in the slot to receive the feedback transmission based on one or more of the feedback mode, the feedback type, or the feedback timing value.

In Example 51, the method of examples 34-50 may include mapping, based on one or more of the feedback mode, the feedback type, or the feedback timing value, a PSSCH associated with the data transmission to a HARQ feedback resource associated with one or more of the one or more HARQ feedback resources or the one or more HARQ feedback resource sets in the slot, where transmitting the HARQ feedback includes: receiving the HARQ feedback using the HARQ feedback resource.

In Example 52, the method of examples 34-51 may include where one or more of the feedback mode or the feedback type corresponds to different sequences.

In Example 53, the method of examples 34-52 may include where one or more of the feedback mode or the feedback type corresponds to a sequence with different cyclic shifts.

In Example 54, the method of examples 34-53 may include determining the different cyclic shifts based at least in part on a first device identifier associated with the device or a second device identifier associated with a second device.

In Example 55, the method of examples 34-54 may include where one or more of the feedback mode or the feedback type corresponds to a sequence with different cover codes.

In Example 56, the method of examples 34-55 may include determining a resource location (q) of the one or more HARQ feedback resources or the one or more HARQ feedback resource sets in the slot based at least in part on $m_L \times M_K + m_K$, where $m_L$ corresponds to an index of a last slot associated with a PSSCH, $M_K$ corresponds to a quantity of subchannels associated with the one or more HARQ feedback resources or the one or more HARQ feedback resource sets in the slot, and $m_K$ corresponds to a subchannel index associated with a frequency resource location of the PSSCH.

In Example 57, the method of examples 34-56 may include determining a resource location (q) of the one or more HARQ feedback resources or the one or more HARQ feedback resource sets in the slot based at least in part on $m_K \times M_L + m_L$, where $m_K$ corresponds to a subchannel index associated with a frequency resource location of the PSSCH, $M_L$ corresponds to a quantity of slots associated with the one or more HARQ feedback resources or the one or more HARQ feedback resource sets in the slot, and $m_L$ corresponds to an index of a last slot associated with a PSSCH.

In Example 58, the method of examples 34-57 may include where the one or more HARQ feedback resources or the one or more HARQ feedback resource sets in the slot may be frequency division multiplexed.

In Example 59, the method of examples 34-58 may include where the one or more HARQ feedback resources or the one or more HARQ feedback resource sets in the slot may be time division multiplexed.

In Example 60, the method of examples 34-59 may include where the HARQ feedback corresponds to a groupcast HARQ feedback.

In Example 61, is a system including one or more processors and memory in electronic communication with the one or more processors storing instructions executable by the one or more processors to cause the system or apparatus to implement a method as in any of examples 34-60.

In Example 62, is an apparatus including means for implementing a method or realizing an apparatus as in any of examples 34-60.

In Example 63, is a non-transitory computer-readable medium storing instructions executable by one or more processors to cause the one or more processors to implement a method as in any of examples 34-60.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a device, comprising:

receiving a data transmission;

determining a slot to transmit a hybrid automatic repeat request feedback based at least in part on the data transmission;

determining one or more hybrid automatic repeat request feedback resources in the slot to transmit the hybrid automatic repeat request feedback, wherein the one or more hybrid automatic repeat request feedback resources in the slot comprises a set of frequency resources associated with the slot, wherein determining the one or more hybrid automatic repeat request feedback resources in the slot is based at least in part on one or more of a first device identifier associated with the device or a second device identifier associated with a second device; and transmitting the hybrid automatic repeat request feedback using the one or more hybrid automatic repeat request feedback resources in the slot and using one or more cyclic shifts based at least in part on a feedback type of the one or more hybrid automatic repeat request feedback resources, wherein the feedback type comprises an acknowledgment type or a negative acknowledgment type.

2. The method of claim 1, wherein the one or more hybrid automatic repeat request feedback resources comprises one or more orthogonal frequency-division multiplexing symbols in a time domain and one or more resource blocks in a frequency domain.

3. The method of claim 1, wherein receiving the data transmission comprises:
   receiving the data transmission on a physical shared channel, wherein the physical shared channel comprises a physical sidelink shared channel (PSSCH), the method further comprising:
      determining a hybrid automatic repeat request feedback resource location of the one or more hybrid automatic repeat request feedback resources in the slot based at least in part on one or more of a starting frequency resource of the data transmission, a starting frequency resource of a transmission of a control channel associated with the data transmission, an ending timing resource of a physical sidelink control channel (PSCCH), a subchannel index of the PSSCH, or a subchannel index of the PSCCH,
      wherein determining the one or more hybrid automatic repeat request feedback resources in the slot to transmit the hybrid automatic repeat request feedback is based at least in part on determining the hybrid automatic repeat request feedback resource location.

4. The method of claim 1, wherein receiving the data transmission comprises:
   receiving the data transmission on a physical shared channel, wherein the physical shared channel comprises a physical sidelink shared channel (PSSCH), the method further comprising:
      determining a resource from the one or more hybrid automatic repeat request feedback resources in the slot based at least in part on one or more of the first device identifier associated with the device or the second device identifier associated with the second device,
      wherein transmitting the hybrid automatic repeat request feedback using the one or more hybrid automatic repeat request feedback resources in the slot comprises transmitting the hybrid automatic repeat request feedback using the determined resource.

5. The method of claim 4, wherein one or more of the first device identifier associated with the device or the second device identifier associated with the second device is a layer one identifier.

6. The method of claim 4, further comprising:
   receiving sidelink control information carrying the second device identifier associated with the second device, wherein determining the resource from the one or more hybrid automatic repeat request feedback resources in the slot to transmit the hybrid automatic repeat request feedback is based at least in part on the second device identifier associated with the second device.

7. The method of claim 4, wherein one or more of the first device identifier associated with the device comprises a layer one identifier, a group identifier, or an upper layer identifier, and wherein determining the resource from the one or more hybrid automatic repeat request feedback resources in the slot to transmit the hybrid automatic repeat request feedback is based at least in part on the layer one identifier, the group identifier, or the upper layer identifier.

8. The method of claim 1, further comprising:
   decoding one or more of a control portion or a data portion of the data transmission, wherein the data transmission comprises a sidelink transmission, and wherein transmitting the hybrid automatic repeat request feedback comprises:
      transmitting, after decoding one or more of the control portion or the data portion of the data transmission, the hybrid automatic repeat request feedback using the one or more hybrid automatic repeat request feedback resources in the slot.

9. The method of claim 1, wherein determining the one or more hybrid automatic repeat request feedback resources in the slot to transmit the hybrid automatic repeat request feedback comprises:
   determining a number of resource blocks for the hybrid automatic repeat request feedback based at least in part on one or more of an ending timing resource of a physical sidelink control channel (PSCCH), a subchannel index of a physical sidelink shared channel (PSSCH), or a subchannel index of the PSCCH.

10. The method of claim 9, wherein receiving the data transmission comprises:
    receiving the data transmission on a physical shared channel, wherein the physical shared channel comprises the PSSCH, wherein determining the number of resource blocks for the hybrid automatic repeat request feedback comprises:
       determining a set of hybrid automatic repeat request feedback resources corresponding to the data transmission.

11. The method of claim 10, wherein the PSSCH is transmitted by the second device, and wherein determining the one or more hybrid automatic repeat request feedback resources comprises selecting from the set of hybrid automatic repeat request feedback resources corresponding to the data transmission and based at least in part on the first device identifier or the second device identifier.

12. The method of claim 1, further comprising:
    determining a resource location (q) of the one or more hybrid automatic repeat request feedback resources in the slot based at least in part on $mL \times MK + mK$, wherein mL corresponds to an index of a last slot associated with a physical sidelink shared channel (PSSCH), MK corresponds to a quantity of subchannels associated with the one or more hybrid automatic repeat request feedback resources in the slot, and mK corresponds to a subchannel index associated with a frequency resource location of the PSSCH.

13. The method of claim 1, further comprising:
    determining a resource location (q) of the one or more hybrid automatic repeat request feedback resources in the slot based at least in part on $mK \times ML + mL$, wherein mK corresponds to a subchannel index associated with a frequency resource location of a physical sidelink shared channel (PSSCH), ML corresponds to a quantity of slots associated with the one or more hybrid automatic repeat request feedback resources in the slot, and mL corresponds to an index of a last slot associated with a PSSCH.

14. The method of claim 1, wherein the one or more hybrid automatic repeat request feedback resources in the slot are frequency division multiplexed.

15. A method for wireless communication at a device, comprising:
    transmitting a data transmission;
    determining a slot to receive a hybrid automatic repeat request feedback based at least in part on the data transmission;
    determining one or more hybrid automatic repeat request feedback resources in the slot to receive the hybrid automatic repeat request feedback, wherein the one or more hybrid automatic repeat request feedback resources in the slot comprises a set of frequency resources associated with the slot, wherein determining the one or more hybrid automatic repeat request feedback resources in the slot is based at least in part on one or more of a first device identifier associated with the device or a second device identifier associated with a second device; and
    receiving the hybrid automatic repeat request feedback using the one or more hybrid automatic repeat request feedback resources in the slot and using one or more cyclic shifts that are each associated with a feedback type of the one or more hybrid automatic repeat request feedback resources, wherein the feedback type comprises an acknowledgment type or a negative acknowledgment type.

16. The method of claim 15, wherein the one or more hybrid automatic repeat request feedback resources comprises one or more orthogonal frequency-division multiplexing symbols in a time domain and one or more resource blocks in a frequency domain.

17. The method of claim 15, wherein transmitting the data transmission comprises:
    transmitting the data transmission on a physical shared channel, wherein the physical shared channel comprises a physical sidelink shared channel (PSSCH), the method further comprising:
    determining a hybrid automatic repeat request feedback resource location of the one or more hybrid automatic repeat request feedback resources in the slot based at least in part on one or more of a starting frequency resource of the data transmission, a starting frequency resource of a transmission of a control channel associated with the data transmission, an ending timing resource of a physical sidelink control channel (PSCCH), a subchannel index of the PSSCH, or a subchannel index of the PSCCH,
    wherein determining the one or more hybrid automatic repeat request feedback resources in the slot to receive the hybrid automatic repeat request feedback is based at least in part on determining the hybrid automatic repeat request feedback resource location.

18. The method of claim 15, wherein transmitting the data transmission comprises:
    transmitting the data transmission on a physical shared channel, wherein the physical shared channel comprises a physical sidelink shared channel (PSSCH), the method further comprising:
    determining a resource from the one or more hybrid automatic repeat request feedback resources in the slot based at least in part on one or more of the first device identifier associated with the device or the second device identifier associated with the second device,
    wherein receiving the hybrid automatic repeat request feedback using the one or more hybrid automatic repeat request feedback resources in the slot comprises receiving the hybrid automatic repeat request feedback using the determined resource.

19. The method of claim 18, wherein one or more of the first device identifier associated with the device or the second device identifier associated with the second device is a layer one identifier.

20. The method of claim 18, further comprising:
    receiving sidelink control information carrying the second device identifier associated with the second device,
    wherein determining the resource from the one or more hybrid automatic repeat request feedback resources in the slot to receive the hybrid automatic repeat request feedback is based at least in part on the second device identifier associated with the second device.

21. The method of claim 18, wherein one or more of the first device identifier associated with the device comprises a layer one identifier, a group identifier, or an upper layer identifier, and wherein determining the resource from the one or more hybrid automatic repeat request feedback resources in the slot to receive the hybrid automatic repeat request feedback is based at least in part on the layer one identifier, the group identifier, or the upper layer identifier.

22. The method of claim 15, wherein determining the one or more hybrid automatic repeat request feedback resources in the slot to receive the hybrid automatic repeat request feedback comprises:
    determining a number of resource blocks for the hybrid automatic repeat request feedback based at least in part on one or more of an ending timing resource of a physical sidelink control channel (PSCCH), a subchannel index of a physical sidelink shared channel (PSSCH), or a subchannel index of the PSCCH.

23. The method of claim 22, wherein transmitting the data transmission comprises:
    transmitting the data transmission on a physical shared channel, wherein the physical shared channel comprises the PSSCH, wherein determining the number of resource blocks for the hybrid automatic repeat request feedback comprises:
    determining a set of hybrid automatic repeat request feedback resources corresponding to the data transmission.

24. The method of claim 23, wherein the PSSCH is transmitted by the second device, and wherein determining the one or more hybrid automatic repeat request feedback resources comprises selecting from the set of hybrid automatic repeat request feedback resources corresponding to the data transmission and based at least in part on the first device identifier or the second device identifier.

25. The method of claim 15, further comprising:
    determining a resource location (q) of the one or more hybrid automatic repeat request feedback resources in the slot based at least in part on mL×MK+mK, wherein mL corresponds to an index of a last slot associated with a physical sidelink shared channel (PSSCH), MK corresponds to a quantity of subchannels associated with the one or more hybrid automatic repeat request feedback resources in the slot, and mK corresponds to a subchannel index associated with a frequency resource location of the PSSCH.

26. The method of claim 15, further comprising:
determining a resource location (q) of the one or more hybrid automatic repeat request feedback resources in the slot based at least in part on mK×ML+mL, wherein mK corresponds to a subchannel index associated with a frequency resource location of a physical sidelink shared channel (PSSCH) the PSSCH, ML corresponds to a quantity of slots associated with the one or more hybrid automatic repeat request feedback resources in the slot, and mL corresponds to an index of a last slot associated with the PSSCH.

27. The method of claim 15, wherein the one or more hybrid automatic repeat request feedback resources in the slot are frequency division multiplexed.

28. An apparatus for wireless communication, comprising:
one or more memories storing processor-executable code; and
one or more processors coupled with the one or more memories and individually or collectively operable to execute the code to cause the apparatus to:
receive a data transmission;
determine a slot to transmit a hybrid automatic repeat request feedback based at least in part on the data transmission;
determine one or more hybrid automatic repeat request feedback resources in the slot to transmit the hybrid automatic repeat request feedback, wherein the one or more hybrid automatic repeat request feedback resources in the slot comprises a set of frequency resources associated with the slot, wherein determining the one or more hybrid automatic repeat request feedback resources in the slot is based at least in part on one or more of a first device identifier associated with the apparatus or a second device identifier associated with a second apparatus; and
transmit the hybrid automatic repeat request feedback using the one or more hybrid automatic repeat request feedback resources in the slot and using one or more cyclic shifts based at least in part on a feedback type of the one or more hybrid automatic repeat request feedback resources, wherein the feedback type comprises an acknowledgment type or a negative acknowledgment type.

29. An apparatus for wireless communication, comprising:
one or more memories storing processor-executable code; and
one or more processors coupled with the one or more memories and individually or collectively operable to execute the code to cause the apparatus to:
transmit a data transmission;
determine a slot to receive a hybrid automatic repeat request feedback based at least in part on the data transmission;
determine one or more hybrid automatic repeat request feedback resources in the slot to receive the hybrid automatic repeat request feedback, wherein the one or more hybrid automatic repeat request feedback resources in the slot comprises a set of frequency resources associated with the slot, wherein determining the one or more hybrid automatic repeat request feedback resources in the slot is based at least in part on one or more of a first device identifier associated with the apparatus or a second device identifier associated with a second apparatus; and
receive the hybrid automatic repeat request feedback using the one or more hybrid automatic repeat request feedback resources in the slot using one or more cyclic shifts that are each associated with a feedback type of the one or more hybrid automatic repeat request feedback resources, wherein the feedback type comprises an acknowledgment type or a negative acknowledgment type.

30. The apparatus of claim 28, wherein the one or more hybrid automatic repeat request feedback resources comprises one or more orthogonal frequency-division multiplexing symbols in a time domain and one or more resource blocks in a frequency domain.

* * * * *